(12) United States Patent
Shinkai et al.

(10) Patent No.: US 12,374,867 B2
(45) Date of Patent: Jul. 29, 2025

(54) TRANSIENT VOLTAGE PROTECTION DEVICE

(71) Applicant: TDK CORPORATION, Tokyo (JP)

(72) Inventors: Yoshihiro Shinkai, Tokyo (JP); Naoyoshi Yoshida, Tokyo (JP); Masato Hayatsu, Tokyo (JP); Shunsuke Takahashi, Tokyo (JP); Sota Hiraba, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 18/437,653

(22) Filed: Feb. 9, 2024

(65) Prior Publication Data

US 2024/0275135 A1  Aug. 15, 2024

(30) Foreign Application Priority Data

Feb. 10, 2023 (JP) .................. 2023-019336
Dec. 15, 2023 (JP) .................. 2023-212043

(51) Int. Cl.
*H01T 4/10* (2006.01)
*H01T 1/22* (2006.01)
*H02H 9/04* (2006.01)

(52) U.S. Cl.
CPC ............. *H01T 4/10* (2013.01); *H01T 1/22* (2013.01); *H02H 9/044* (2013.01)

(58) Field of Classification Search
CPC .... H01T 4/12; H01T 4/10; H01T 4/02; H01T 4/04; H01T 1/20; H01T 1/22; H01T 1/15; H01T 21/00; H01T 2/02
See application file for complete search history.

(56) References Cited

U.S. PATENT DOCUMENTS

2010/0309595 A1  12/2010  Adachi et al.

FOREIGN PATENT DOCUMENTS

| TW | I427880 B | * | 2/2014 | ............... H01T 4/12 |
| WO | 2009/098944 A1 | | 8/2009 | |
| WO | WO-2013137032 A1 | * | 9/2013 | ............... H01T 1/20 |

OTHER PUBLICATIONS

TW I427880 B (Year: 2014).*
WO 2013137032 A1 (Year: 2013).*

* cited by examiner

*Primary Examiner* — Bryan R Perez
(74) *Attorney, Agent, or Firm* — Oliff PLC

(57) ABSTRACT

A transient voltage protection device comprises a pair of discharge electrodes opposing each other with a gap therebetween and a discharge inducing portion in contact with the pair of discharge electrodes. The discharge inducing portion comprises a ceramic component, metal particles, and pores discontinuously scattered. The pores have an average size of 0.05 μm or more and 1.04 μm or less.

6 Claims, 12 Drawing Sheets

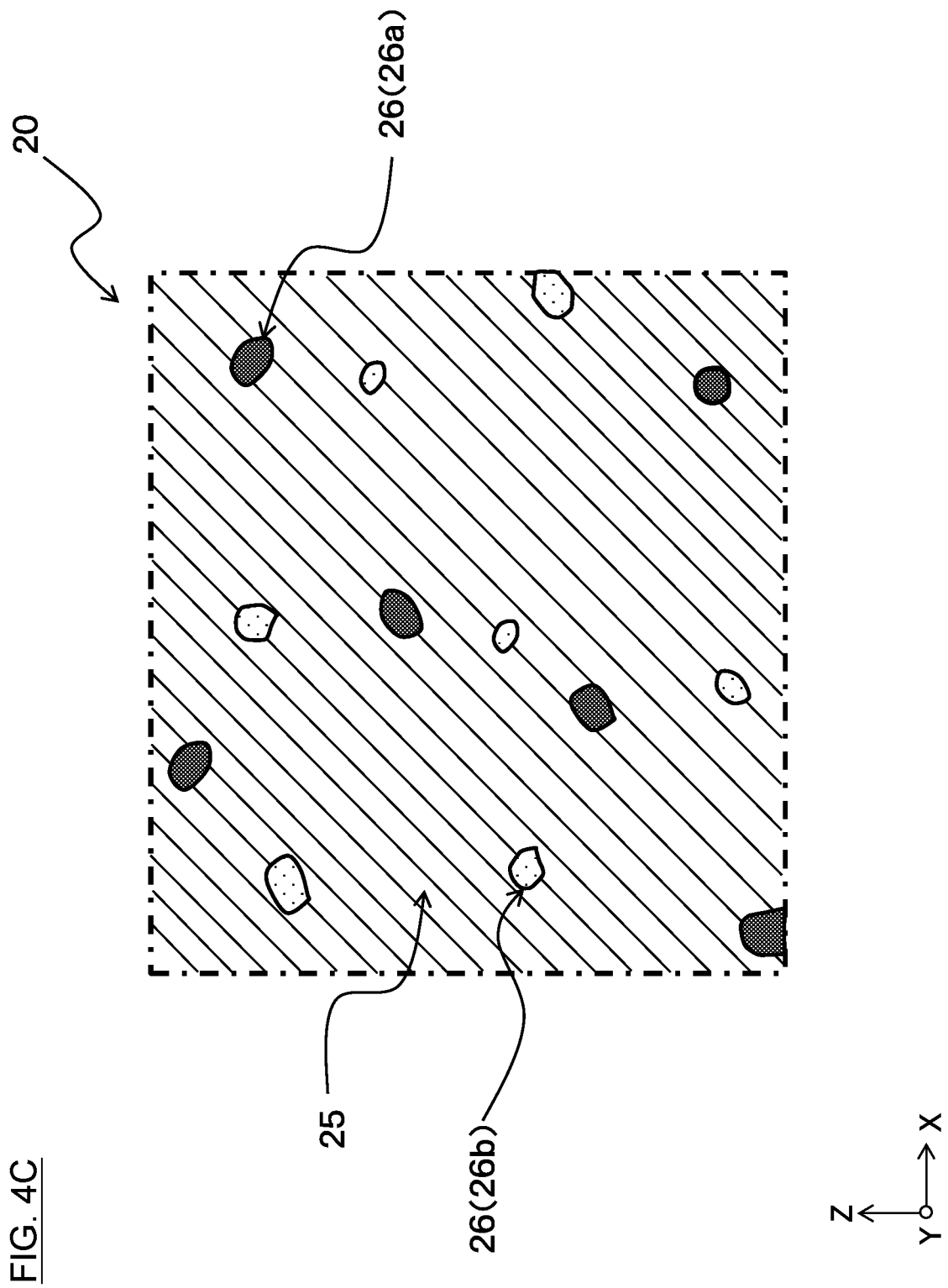

TRANSIENT VOLTAGE PROTECTION DEVICE

TECHNICAL FIELD

The present disclosure relates to a transient voltage protection device.

BACKGROUND

In recent years, importance has been attached to electronic devices for protecting circuits from transient voltages, such as electrostatic discharge (ESD), along with smaller sizes and higher performance of electronic equipment. For example, Patent Document 1 discloses a transient voltage protection device (a so-called ESD suppressor) including a pair of discharge electrodes facing each other and a discharge inducing portion adjacent to the discharge electrodes. A transient voltage protection device such as that disclosed in Patent Document 1 can reduce capacitance more than other ESD protection elements (e.g., multilayer varistors and Zener diodes) can and is suitable for high-speed transmission circuits, high-frequency circuits, and the like.

However, demands have been further increasing for a higher transmission speed and a lower drive voltage of electronic equipment. To respond to these demands, a demand for a transient voltage protection device to have a reduced discharge start voltage and improved ESD resistance has been rising.

Patent Document 1: WO 2009/098944

SUMMARY

It is an object of exemplary embodiments of the present disclosure to provide a transient voltage protection device having a low discharge start voltage and high ESD resistance.

To achieve the above object, a transient voltage protection device according to the present disclosure comprises:

a pair of discharge electrodes opposing each other with a gap therebetween; and a discharge inducing portion in contact with the pair of discharge electrodes, wherein the discharge inducing portion comprises a ceramic component, metal particles, and pores discontinuously scattered; and the pores have an average size of 0.05 μm or more and 1.04 μm or less.

The above characteristics of the transient voltage protection device allow the transient voltage protection device to have a lower discharge start voltage and higher ESD resistance than a conventional transient voltage protection device.

Preferably, a ratio of a total area of the pores to a total area of the metal particles in a section of the discharge inducing portion is 0.45 or more and 1.24 or less.

Preferably, nearest inter-particle distances between the metal particles average 0.25 μm or more and 0.81 μm or less.

Preferably, the metal particles comprise at least one selected from the group consisting of Pd, Ag, and Pt as a main component.

Preferably, the discharge inducing portion further comprises a zirconia particle.

BRIEF DESCRIPTION OF THE DRAWING(S)

FIG. 4C is still another example schematic sectional view of the discharge electrode.

DETAILED DESCRIPTION

Figure 1:
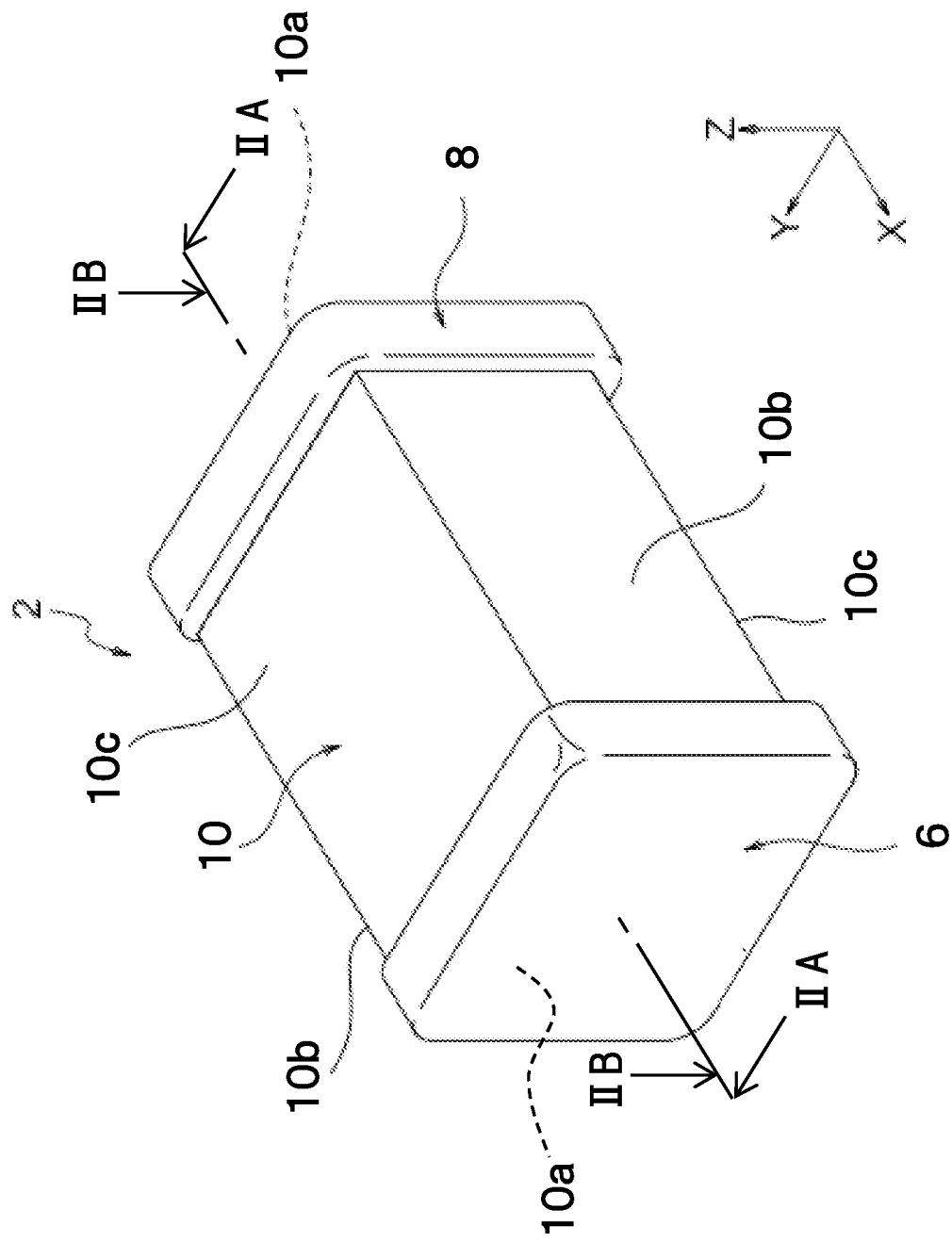
FIG. 1 is a perspective view of a transient voltage protection device according to an embodiment of the present disclosure.

Embodiments of the present disclosure are described below with reference to the drawings. The embodiments of the present disclosure described below are exemplifications illustrative of the present disclosure; and components, such as numerical values, shapes, materials, and manufacturing steps, according to the embodiments may be modified or changed to the extent that technical problems do not arise. Shapes and the like illustrated in the drawings of the present disclosure do not necessarily match actual shapes and dimensions, because shapes and dimensions in the drawings may be modified for illustration purposes.

First Embodiment

As shown in FIG. 1, a transient voltage protection device 2 according to the present embodiment includes an element body 10 having a hexahedral shape (rectangular parallelepiped shape) and a pair of external electrodes (a first external electrode 6 and a second external electrode 8) provided at outer surfaces of the element body 10.

The element body 10 includes a pair of end surfaces 10a substantially perpendicular to the X-axis, a pair of side surfaces 10b substantially perpendicular to the Y-axis, and a pair of main surfaces 10c substantially perpendicular to the Z-axis. Dimensions of the element body 10 are not limited and are determined as appropriate based on usage. In the drawings, the X-axis, the Y-axis, and the Z-axis are substantially mutually perpendicular.

The first external electrode 6 covers one end surface 10a and is provided to extend from the end surface 10a to part of the side surfaces 10b and part of the main surfaces 10c. The second external electrode 8 covers the other end surface 10a and is provided to extend from this end surface 10a to part of the side surfaces 10b and part of the main surfaces 10c. The first external electrode 6 and the second external electrode 8 are insulated so as not to be in contact with each other in the X-axis direction.

Figure 2A:
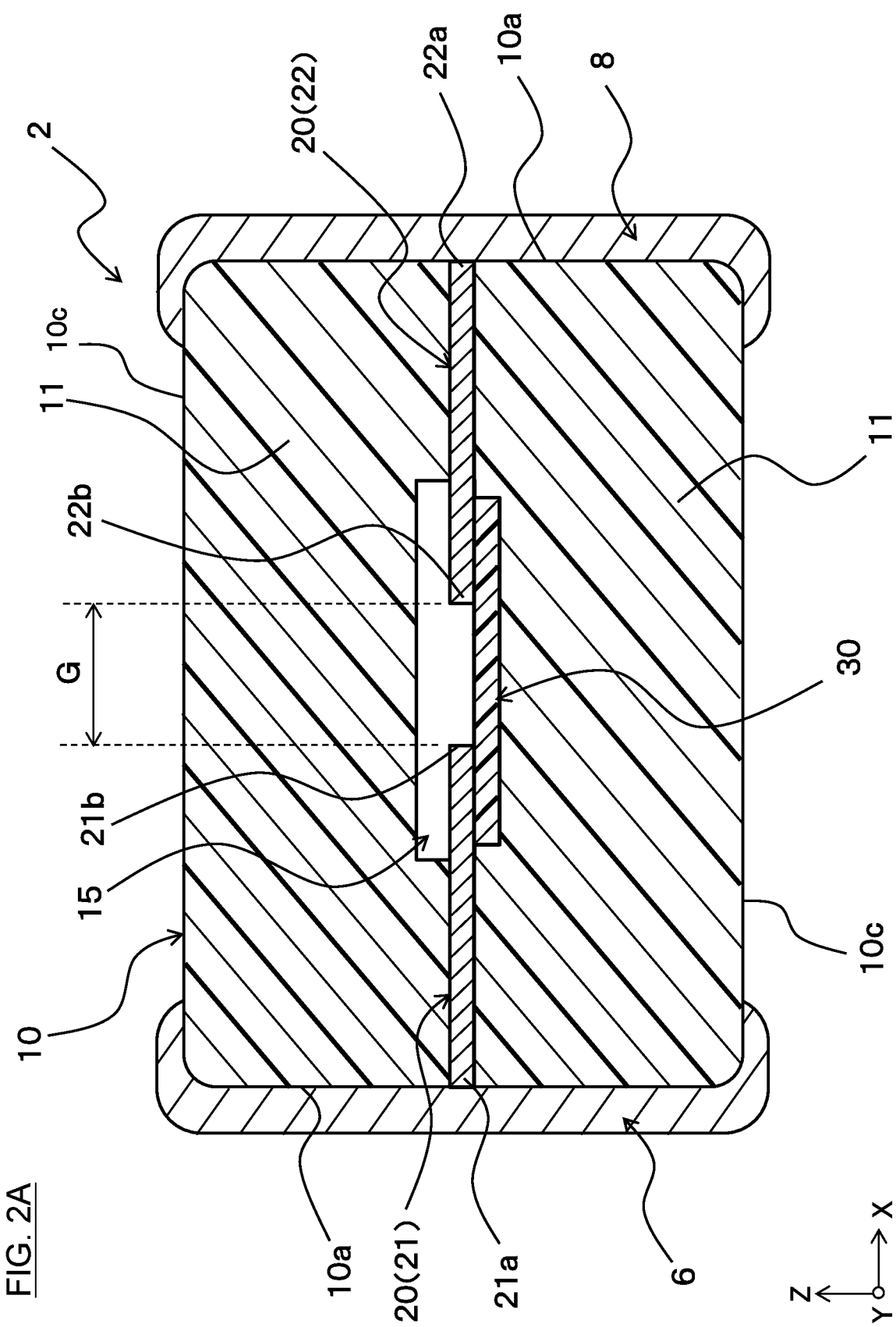
FIG. 2A is a sectional view along line IIA-IIA shown in FIG. 1.
Figure 2B:
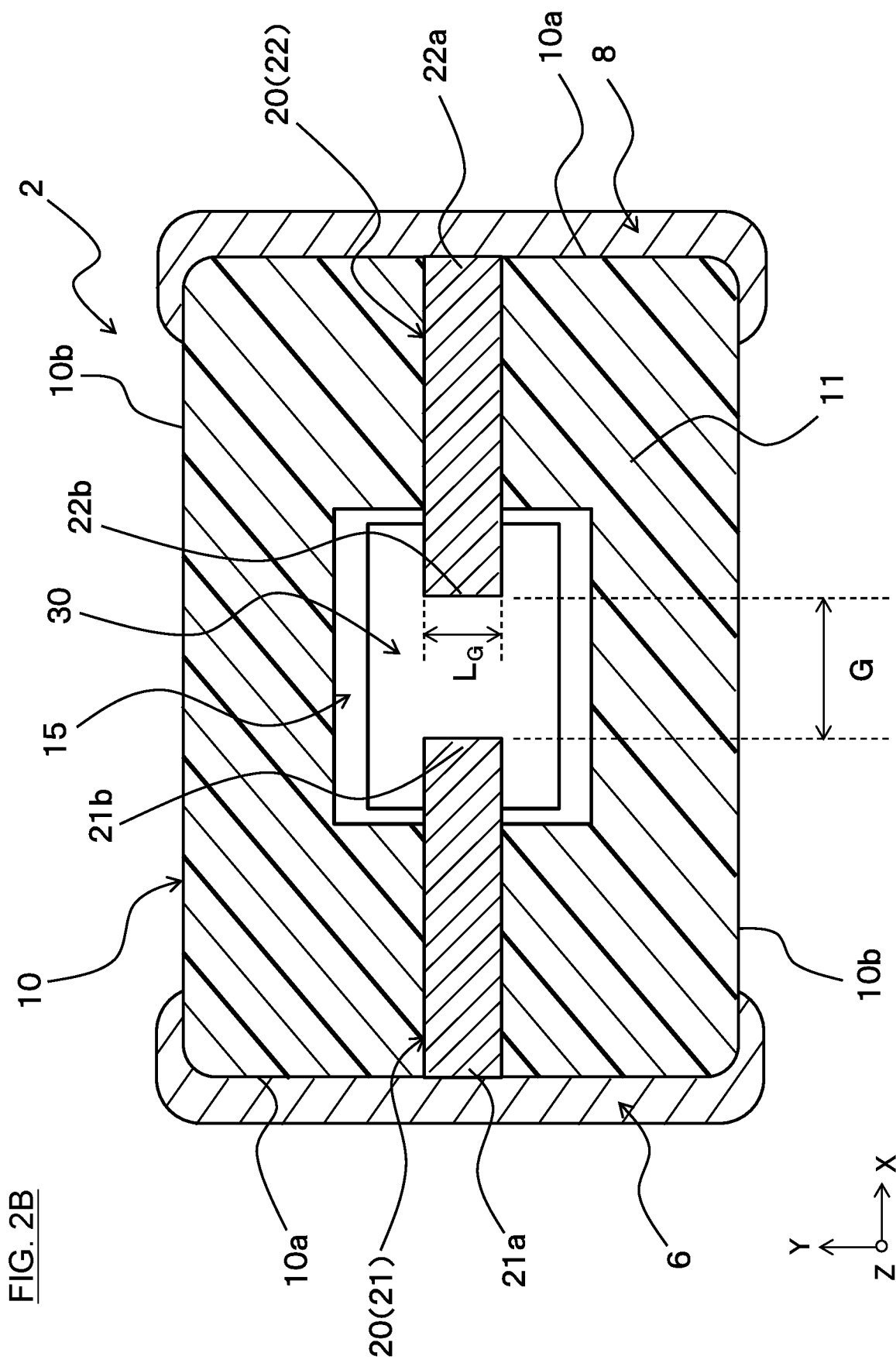
FIG. 2B is a sectional view along line IIB-IIB shown in FIG. 1.

FIG. 2A shows an X-Z section of the transient voltage protection device 2 cut at an approximate Y-axial center. By contrast, FIG. 2B is an X-Y section of the transient voltage protection device 2 cut at an approximate Z-axial center. As shown in FIGS. 2A and 2B, the element body 10 includes insulation layers 11, a pair of discharge electrodes 20, a discharge inducing portion 30, and a cavity 15.

All of the insulation layers 11 are electrically insulating sintered bodies and are laminated along the Z-axis direction. The insulation layers 11 are integrated in such a way that boundaries between the insulation layers 11 next to each other cannot be visually recognized. The thickness and the number of the insulation layers 11 are not limited and are determined as appropriate based on the dimensions of the element body 10.

One discharge electrode electrically connected to the first external electrode 6 among the pair of discharge electrodes 20 is referred to as a "first discharge electrode 21", and the other discharge electrode electrically connected to the second external electrode 8 is referred to as a "second discharge electrode 22". When the term "discharge electrode 20" or "discharge electrodes 20" is used collectively in the following description, the description is illustrative of characteristics common to both the first discharge electrode 21 and the second discharge electrode 22.

Each discharge electrode 20 is an electrode layer having a rectangular shape in plan view and is interposed between predetermined insulation layers 11. Each discharge electrode 20 may have any average thickness $T_{DE}$. For example, $T_{DE}$ may be 2 μm or more and 20 μm or less or is preferably 3 μm or more and 10 μm or less. The first discharge electrode 21 and the second discharge electrode 22 may have different average thicknesses but preferably have approximately the same average thickness.

Both the first discharge electrode 21 and the second discharge electrode 22 are laminated on the same insulation layer 11; and the distances in the Z-axis direction between the main surfaces 10c and the first discharge electrode 21 and the distances in the Z-axis direction between the main surfaces 10c and the second discharge electrode 22 are substantially the same. That is, the first discharge electrode 21 and the second discharge electrode 22 are located at approximately the same height in the Z-axis direction. However, the first discharge electrode 21 and the second discharge electrode 22 are disposed apart from each other so as not to be in direct contact with each other in the X-axis direction.

The first discharge electrode 21 includes a lead-out portion 21a and an opposing portion 21b. The lead-out portion 21a is an end portion of the first discharge electrode 21 facing outwards in the X-axis direction. The lead-out portion 21a is exposed from the corresponding end surface 10a of the element body 10 and is electrically connected to the first external electrode 6. By contrast, the opposing portion 21b is an end portion of the first discharge electrode 21 facing inwards in the X-axis direction. The opposing portion 21b is located inside the cavity 15 and opposes an opposing portion 22b of the second discharge electrode 22.

The second discharge electrode 22 includes a lead-out portion 22a and the opposing portion 22b. The lead-out portion 22a is an end portion of the second discharge electrode 22 facing outwards in the X-axis direction. The lead-out portion 22a is exposed from the corresponding end surface 10a of the element body 10 and is electrically connected to the second external electrode 8. By contrast, the opposing portion 22b is an end portion of the second discharge electrode 22 facing inwards in the X-axis direction. The opposing portion 22b is located inside the cavity 15 and opposes the opposing portion 21b of the first discharge electrode 21.

The opposing portions 21b and 22b are apart in the X-axis direction; and a gap G is provided between the opposing portions 21b and 22b. When a voltage not smaller than a predetermined voltage is applied between the first external electrode 6 and the second external electrode 8, electric discharge occurs at the gap G. The transient voltage protection device 2 assumes a role of preventing application of a transient voltage to a device under protection (DUP) using the above-mentioned electric discharge between the opposing portions 21b and 22b.

The gap G may have any width in the X-axis direction. The width is determined as appropriate so that desired discharge characteristics are exhibited. For example, the width of the gap G in the X-axis direction may be 10 μm or more and 150 μm or less or is preferably 30 μm or more and 100 μm or less. The opposing portions of the discharge electrodes opposing each other above the discharge inducing portion 30 may have any length $L_G$ (length of the opposing portions 21b and 22b in the Y-axis direction). For example, the length $L_G$ may be 10 μm or more and 500 μm or less or is preferably 30 μm or more and 200 μm or less. A ratio ($L_G$/G) of the length $L_G$ to the width of the gap G in the X-axis direction may be, for example, 0.1 or more and 30 or less or is preferably 0.5 or more and 10 or less.

The discharge inducing portion 30 is laminated below the discharge electrodes 20 along the Z-axis so that the discharge inducing portion 30 is in contact with both discharge electrodes 20 in the lamination direction. In other words, the discharge inducing portion 30 is provided to extend over the first discharge electrode 21 and the second discharge electrode 22 and connects the opposing portions 21b and 22b. The discharge inducing portion 30 has a substantially rectangular shape in plan view viewed from the lamination direction. Preferably, the width of the discharge inducing portion 30 in the X-axis direction is larger than the width of the gap G, and the length of the discharge inducing portion 30 in the Y-axis direction is larger than the length of the opposing portions in the Y-axis direction. The discharge inducing portion 30 may have any average thickness $T_{AE}$; and $T_{AE}$ is preferably, for example, 1 μm to 15 μm. The discharge inducing portion 30 has a function of readily generating electric discharge between the first discharge electrode 21 and the second discharge electrode 22.

The cavity 15 is a space formed by burning an organic component (lacquer) out in a manufacturing process of the transient voltage protection device 2. As shown in FIG. 2A, surfaces defining the cavity 15 include a surface in the vicinity of the opposing portion 21b of the first discharge electrode 21, a surface in the vicinity of the opposing portion 22b of the second discharge electrode 22, a surface of the discharge inducing portion 30, and a lower surface of the insulation layer 11 located above the discharge electrodes 20. The shape or dimensions of the cavity 15 are not limited; however, the cavity 15 is preferably provided so as to cover the opposing portions of the discharge electrodes 20 and the discharge inducing portion 30 when viewed from the lamination direction. The cavity 15 has a function of absorbing thermal expansion of the first discharge electrode 21, the second discharge electrode 22, the insulation layer 11 adjacent to the discharge electrodes 20, and the discharge inducing portion 30 during electric discharge.

Now, characteristics of materials and the like of each component are described in detail.

The insulation layers 11 are composed of any insulating inorganic compound, and the composition of the insulation layers 11 is not limited. For example, the insulation layers 11 may contain one inorganic compound or at least two inorganic compounds selected from the group consisting of $Fe_2O_3$, NiO, copper oxide (CuO, $Cu_2O$), ZnO, MgO, $SiO_2$, $TiO_2$, $MnCO_3$, $SrCO_3$, $CaCO_3$, $BaCO_3$, $Al_2O_3$, $ZrO_2$, and $B_2O_3$. In particular, the insulation layers 11 preferably contain $ZrO_2$ or/and copper oxide. When at least two inorganic compounds are contained, these inorganic compounds may be present as a complex compound (e.g., $CaZrO_3$). The insulation layers 11 may also contain glass or a subcomponent compound containing a rare-earth element or the like, together with the above-mentioned inorganic compounds.

The discharge electrodes 20 are sintered body layers of conductive metal. That is, a main component of the discharge electrodes 20 is conductive metal; and the discharge electrodes 20 may contain, as a main component, Ag, Pd, Au, Pt, Cu, Ni, Al, Mo, W, or an alloy containing at least one of these metal elements. In particular, the discharge electrodes 20 preferably contain Pd, Ag, or Pt as a main component, and at least one of Pd, Pt, and a Ag—Pd alloy is preferably used. The main component may constitute 30 wt % or more, preferably constitutes 50 wt % or more, more preferably constitutes 80 wt % or more, or still more preferably constitutes 90 wt % or more of the discharge electrodes 20.

The first discharge electrode 21 and the second discharge electrode 22 may have different main components but preferably contain the same main component. The discharge electrodes 20 may contain a trace amount (e.g., 1 wt % or less) of non-metal components, such as S and P.

Figure 3A:
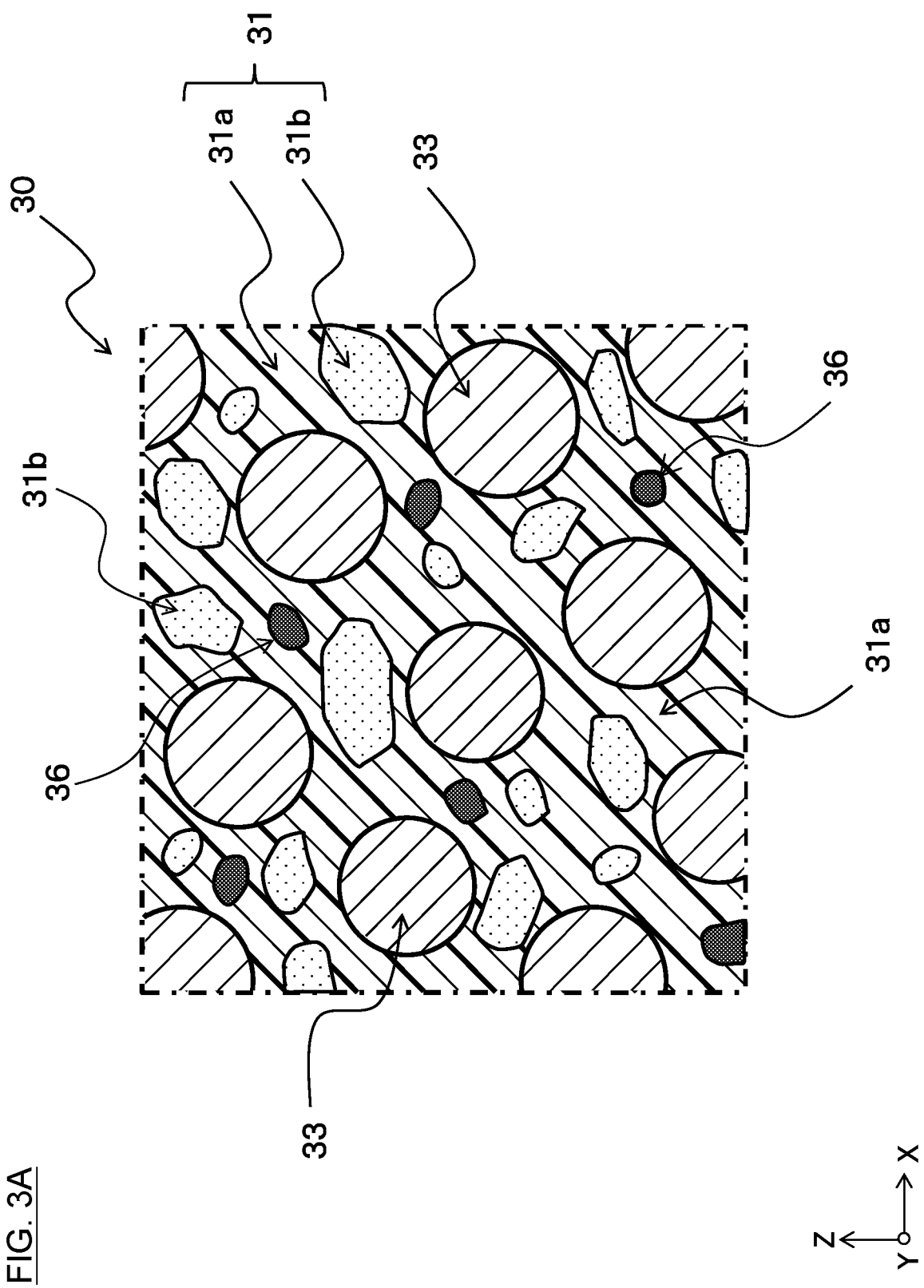
FIG. 3A is a schematic sectional view of a discharge inducing portion.

As shown in FIG. 3A, the discharge inducing portion 30 includes a ceramic component 31, metal particles 33, and pores 36. The ceramic component 31 of the discharge inducing portion 30 preferably includes glass 31a, which is a base material, and ceramic particles 31b, which are non-glass. In a section shown in FIG. 3A, the metal particles 33, the ceramic particles 31b, and the pores 36 are dispersed in the glass 31a, which is the base material.

The metal particles 33 have a melting point (solidus temperature) that is higher than a firing temperature of the element body 10. Specifically, as the metal particles 33, Ag particles, Pd particles, Au particles, Pt particles, Cu particles, Ag—Pd alloy particles, Ag—Au alloy particles, Ag—Pt alloy particles, or the like can be used. The metal particles 33 preferably contain at least one selected from the group consisting of Pd, Ag, and Pt as a main component; and at least one selected from the group consisting of Pd particles, Pt particles, and Ag—Pd alloy particles is preferably used. The main component of each metal particle 33 constitutes preferably 30 wt % or more of the metal particle 33 or more preferably 50 wt % or more of the metal particle 33.

The metal particles 33 in a section of the discharge inducing portion 30 have an average particle size $d_M$ of preferably 2.0 μm or less or more preferably 0.1 μm or more and 2.0 μm or less. The metal particles 33 in a section of the discharge inducing portion 30 occupy an area percentage $S_M$ of preferably 10% or more and 50% or less or more preferably 15% or more and 35% or less.

The average particle size $d_M$ and the area percentage $S_M$ of the metal particles 33 are calculated by observing a section of the discharge inducing portion 30 such as that shown in FIG. 3A with an electron microscope, such as a scanning electron microscope (SEM) or a scanning transmission electron microscope (STEM), and performing an image analysis of a resulting sectional photograph. For example, when the average particle size $d_M$ of the metal particles 33 is calculated, preferably, circle equivalent diameters of at least one hundred metal particles 33 are measured to obtain particle size distribution of the metal particles 33.

A particle size at a number-based cumulative frequency of 50% in the particle size distribution is calculated as the average particle size $d_M$ of the metal particles 33. The area percentage $S_M$ of the metal particles 33 can be represented by $S_M (\%)=(A_M/A_{AE})\times 100$, where $A_{AE}$ is the total area of an analyzed section of the discharge inducing portion 30 and $A_M$ is the total area of the metal particles 33 included in the section. When the area percentage of the metal particles 33 is calculated, preferably, multiple sectional images are analyzed to set $A_{AE}$ to at least 400 μm².

The glass 31a is present between the metal particles 33 and joins the metal particles 33. As the glass 31a is present between the metal particles 33, the glass 31a contributes to ensuring insulation between the metal particles 33 and compactness of the discharge inducing portion 30. The glass 31a constitutes preferably 10 wt % or more of the ceramic component (100 wt %) included in the discharge inducing portion 30 or more preferably 12 wt % or more thereof. A maximum percentage of the glass 31a is not limited; and the glass 31a can constitute 100 wt % of the ceramic component but preferably constitutes 50 wt % or less thereof.

The glass 31a may contain, for example, at least one selected from the group consisting of $SiO_2$, $TiO_2$, and an alkali earth metal component, as a main component. An alkali earth metal element is a general term for Be, Mg, Ca, Sr, Ba, and Ra; and the "alkali earth metal component" in the present embodiment refers to a compound, such as oxide, containing an alkali earth metal element. The glass 31a may contain at least one alkali earth metal component. The alkali earth metal component contained in the glass 31a is preferably oxide represented by a chemical formula MO, where "M" is an alkali earth metal element. In particular, as the alkali earth metal component, at least one selected from the group consisting of CaO, SrO, and BaO is preferably contained in the glass 31a.

In addition to the above-mentioned main component, the glass 31a may contain other components, such as $B_2O_3$ or $Al_2O_3$. The other components may constitute any percentage. For example, $B_2O_3$ may constitute 0.1 wt % to 20 wt % of the ceramic component (100 wt %) of the discharge inducing portion 30.

The glass 31a may also contain an alkali metal component, such as $K_2O$ or $Na_2O$. However, the alkali metal component may promote particle growth of the metal particles 33. Thus, the alkali metal component of the discharge inducing portion 30 constitutes preferably 2% or less of the ceramic component (100 wt %); and more preferably, the glass 31a substantially does not contain the alkali metal component. The phrase "substantially does not contain the alkali metal component" means that the alkali metal component constitutes less than 0.1 wt % of the ceramic component. Note that alkali metal is a general term for Li, Na, K, Rb, Cs, and Fr; and the "alkali metal component" in the present embodiment refers to a compound containing an alkali metal element. Normally, the alkali metal component contained in the glass is $Li_2O$, $Na_2O$ $K_2O$ or the like.

The composition of the ceramic component 31 including the glass 31a can be analyzed by various component analyses using, for example, energy-dispersive X-ray spectroscopy (EDS), an electron probe micro-analyzer (EPMA), electron diffraction with a transmission electron microscope (TEM), laser ablation inductively coupled plasma mass spectrometry (LA-ICP-MS), and X-ray fluorescence analysis (XRF). For example, in an observation of a section of the discharge inducing portion 30 using an electron microscope (e.g., a SEM, a STEM, or a TEM), the ceramic component 31 and the metal particles 33 can be distinguished based on contrast. Then, the composition of the metal particles 33 and the composition of the ceramic component 31 including the glass 31a may be analyzed using EDX or EPMA. Alternatively, elements other than the constituent elements of the metal particles 33 may be recognized as constituent elements of the ceramic component 31 after the composition of the metal particles 33 is identified, and percentages of compounds constituting the ceramic component 31 may be calculated using various component analyses, such as ICP and XRF.

As described earlier, the ceramic component 31 of the discharge inducing portion 30 preferably contains the ceramic particles 31b, which are a non-glass material, in addition to the glass 31a. Examples of materials of the ceramic particles 31b include semiconductor compounds (e.g., $SnO_2$ and $RuO_2$), dielectric compounds, zirconia ($ZrO_2$), and amorphous silica. More preferably, the ceramic particles 31b are zirconia particles. The ceramic particles 31b may have any average particle size $d_{CA}$. The average particle size $d_{CA}$ is, for example, preferably 2.0 µm or less, or more preferably 0.01 µm or more and 1.0 µm or less.

When the ceramic particles 31b are zirconia particles, the ceramic particles 31b may constitute 0 wt % to 90 wt % of the ceramic component (100 wt %) of the discharge inducing portion 30 or preferably constitute 10 wt % to 80 wt % thereof. In other words, the zirconia particles (the ceramic particles 31b) in a section of the discharge inducing portion 30 may occupy an area percentage $S_{CA}$ of 0% or more and 85% or less or preferably 8% or more and 70% or less.

The ceramic particles 31b, such as the zirconia particles, dispersed in the glass 31a can be distinguished by, for example, a mapping analysis using EDX or EPMA. Thus, the average particle size $d_{CA}$ and the area percentage $S_{CA}$ of the ceramic particles 31b can be calculated by analyzing a resulting mapping image using a method similar to that of the metal particles 33. That is, in the sectional analysis of the discharge inducing portion 30, circle equivalent diameters of at least one hundred ceramic particles 31b are measured to obtain particle size distribution of the ceramic particles 31b, and a particle size at a number-based cumulative frequency of 50% in the particle size distribution is calculated as the average particle size $d_{CA}$. The area percentage $S_{CA}$ of the ceramic particles 31b can be represented by $S_{CA}$ (%)=($A_{CA}/A_{AE}$)×100, where $A_{AE}$ is the total area of an analyzed section of the discharge inducing portion 30 and $A_{CA}$ is the total area of the ceramic particles 31b included in the section. At this time, preferably, multiple sectional images are analyzed to set $A_{AE}$ to at least 400 µm².

The pores 36 of the discharge inducing portion 30 are discontinuously scattered inside the discharge inducing portion 30 and have an average size $d_{PA}$ of 0.05 µm or more and 1.04 µm or less. The average size $d_{PA}$ of the pores 36 is preferably 0.10 µm or more and less than 1.00 µm or is more preferably 0.15 µm or more and 0.74 µm or less.

The average size $d_{PA}$ of the pores 36 is an arithmetic mean of circle equivalent diameters of the pores 36 in a section of the discharge inducing portion 30 and is calculated by a sectional analysis of the discharge inducing portion 30 using an electron microscope (e.g., a SEM or a STEM). Specifically, respective areas of the pores 36 observed in the section of the discharge inducing portion 30 are measured to identify respective circle equivalent diameters of the pores 36 using the areas. In this analysis, preferably, circle equivalent diameters of at least one hundred pores 36 are identified to calculate the average size $d_{PA}$. In the sectional analysis of the discharge inducing portion 30, the pores 36 can be distinguished based on contrast, and the contrast and the results of the mapping analysis may be taken into consideration in distinguishing the pores 36.

Dispersing the fine pores 36 having the above-mentioned average size $d_{PA}$ inside the discharge inducing portion 30 can reduce the discharge start voltage and improve ESD resistance. The reason why such effects are produced is not necessarily clear but may be as follows.

As described earlier, transient voltages (e.g., ESD) cause electric discharge at the gap G between the discharge electrodes 20 present at the surface of the discharge inducing portion 30. It is assumed that, in the transient voltage protection device 2 of the present embodiment, electric discharge occurs not only at the surface of the discharge inducing portion 30 but also via the fine pores 36 inside the discharge inducing portion 30. It is assumed that such electric discharge via the fine pores 36 increases an ESD absorption effect to enable reduction of the discharge start voltage. It is also assumed that such electric discharge via the fine pores 36 can disperse electric discharge generated at the gap G between the discharge electrodes 20 to improve ESD resistance.

The pores 36 in a section of the discharge inducing portion 30 may occupy an area percentage $S_{PA}$ of, for example, 5% or more and 30% or less or preferably 10% or more and 25% or less. Also, in a section of the discharge inducing portion 30, a ratio of the total area of the pores 36 to the total area of the metal particles 33 (i.e., a ratio of the area percentage $S_{PA}$ of the pores 36 to the area percentage $S_M$ of the of metal particles 33) is preferably 0.45 or more and 1.24 or less or is more preferably 0.58 or more and 0.95 or less. The ratio of the total area of the pores 36 to the total area of the metal particles 33 within the above-mentioned range can further reduce the discharge start voltage and further improve ESD resistance.

Similarly to the area percentage $S_M$ of the metal particles 33, the area percentage $S_{PA}$ of the pores 36 is calculated by a sectional analysis of the discharge inducing portion 30. Specifically, the area percentage $S_{PA}$ of the pores 36 can be represented by $S_{PA}$ (%)=($A_{PA}/A_{AE}$)×100, where $A_{AE}$ is the total area of an analyzed section of the discharge inducing portion 30 and $A_{PA}$ is the total area of the pores 36 of the section. At this time, preferably, multiple sectional images are analyzed to set $A_{AE}$ to at least 400 µm². Note that the ratio of the total area of the pores 36 to the total area of the metal particles 33 can be represented by $A_{PA}/A_M$ (i.e., $S_{PA}/S_M$).

A ratio ($d_{PA}/T_{AE}$) of the average size $d_{PA}$ of the pores 36 to the average thickness $T_{AE}$ of the discharge inducing portion 30 may be, for example, 0.005 or more and 0.25 or less or is preferably 0.01 or more and 0.1 or less. A ratio ($d_{PA}/d_M$) of the average size $d_{PA}$ of the pores 36 to the average particle size $d_M$ of the metal particles 33 is, for example, preferably 0.05 or more and less than 1.00, or more preferably 0.1 or more and 0.8 or less.

When the discharge inducing portion 30 includes the ceramic particles 31b, a ratio ($d_{PA}/d_{CA}$) of the average size $d_{PA}$ of the pores 36 to the average particle size $d_{CA}$ of the ceramic particles 31b may be, for example, 1.00 or more and 50 or less or is preferably above 3.00 and 30 or less. In particular, when the ceramic particles 31b are zirconia particles, $d_{PA}/d_{CA}$ is preferably 3.00 or more and 30 or less or is more preferably above 3.00 and 20 or less.

When the discharge inducing portion 30 includes the ceramic particles 31b, a ratio ($A_{PA}/A_{CA}$, i.e., $S_{PA}/S_{CA}$) of the total area of the pores 36 to the total area of the ceramic particles 31b may be, for example, 0.1 or more and 2.00 or less or is preferably 0.25 or more and less than 1.00. In particular, when the ceramic particles 31*b* are zirconia particles, $A_{P4}/A_{CA}$ is preferably 0.25 or more and less than 1.00 or is more preferably 0.30 or more and 0.80 or less.

In a section of the discharge inducing portion 30, an average nearest inter-particle distance ($ED_{Ave}$) between the metal particles 33 may be 0.20 µm or more and 1.00 µm or less, is preferably 0.25 µm or more and 0.81 µm or less, or more preferably 0.30 µm or more and 0.65 µm or less.

In general, as metal particles occupy a larger percentage of a discharge inducing portion, a larger ESD absorption effect can be expected; however, a larger percentage of metal particles may cause short circuits of a pair of discharge electrodes via the discharge inducing portion. In the transient voltage protection device 2 of the present embodiment, the above-mentioned range of the average nearest inter-particle distance ($ED_{Ave}$) between the metal particles 33 in the discharge inducing portion 30 where the fine pores 36 are dispersed enables more suitable compatibility between a low discharge start voltage and good ESD resistance while short circuits between the discharge electrodes 20 are prevented.

The average nearest inter-particle distance ($ED_{Ave}$) is calculated using the following procedure. First, a center particle CP subject to measurement is freely selected (see FIG. 3B) from the metal particles 33 observed in a section of the discharge inducing portion 30. Then, one metal particle 33 that is nearest to the center particle CP is identified as a nearest particle from other metal particles 33 surrounding the selected center particle CP. For example, in the section shown in FIG. 3B, there are seven metal particles 33, which are denoted by P1 to P7, around the center particle CP; and the metal particle 33 denoted by P5 is the nearest particle.

Figure 3B:
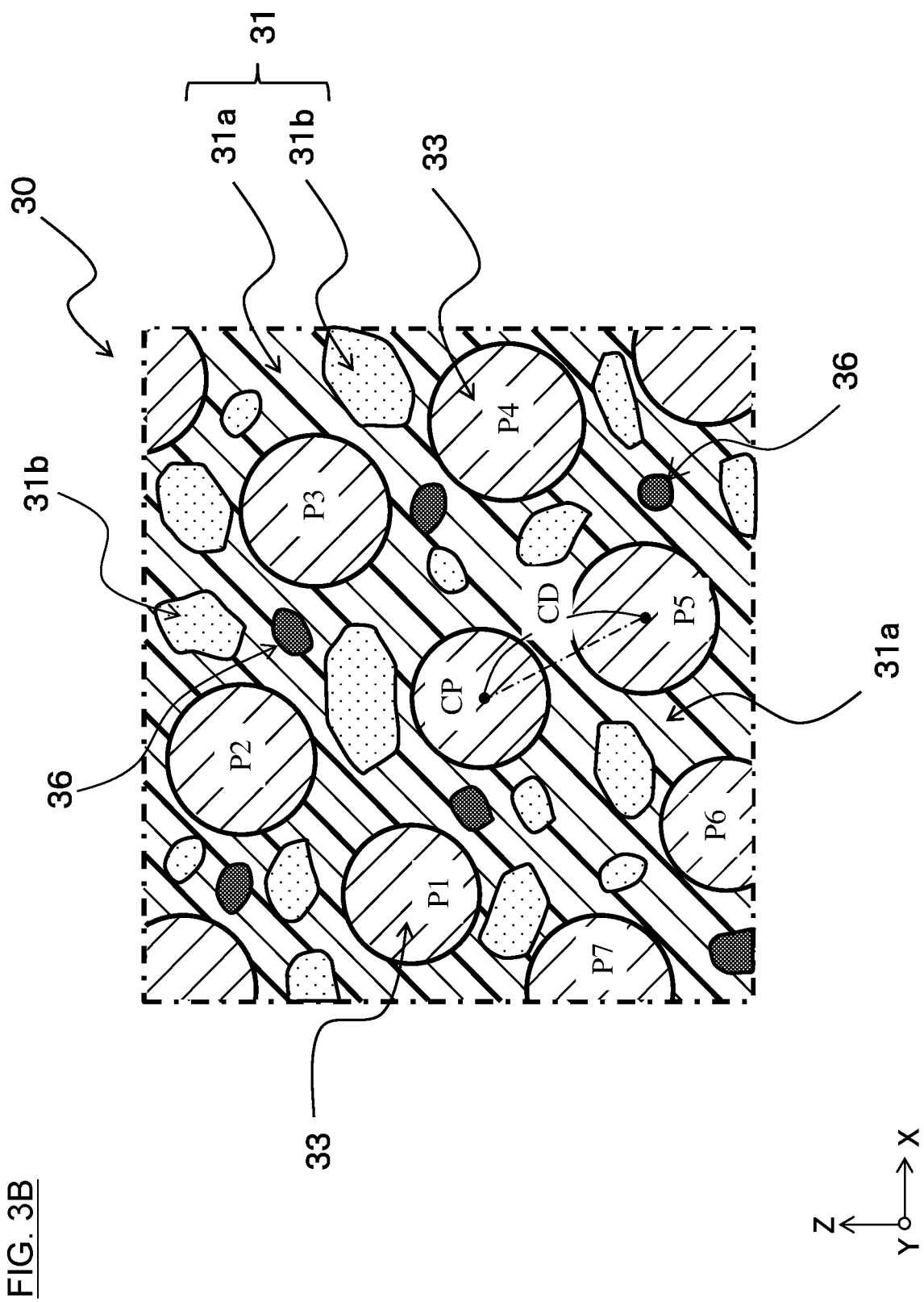
FIG. 3B is a schematic view of a method of measuring a nearest inter-particle distance in the discharge inducing portion.

Next, a centroid-to-centroid distance CD between the center particle CP and the nearest particle is measured, and the average particle size $d_M$ of the metal particles 33 is subtracted from the centroid-to-centroid distance CD, to calculate an inter-edge distance ED. That is, the inter-edge distance ED between the center particle CP and the nearest particle denoted by P5 shown in FIG. 3B is represented by $ED=CD-d_M$. Preferably, at least one hundred metal particles 33 are freely selected as center particles CP to perform the above-mentioned measurement (i.e., the number of samples of inter-edge distances is at least one hundred) to calculate the average nearest inter-particle distance ($ED_{Ave}$).

The first external electrode 6 and the second external electrode 8 can each include a baked electrode layer, a resin electrode layer, a plating electrode layer, or the like; and the first external electrode 6 and the second external electrode 8 may each be constituted by a single electrode layer or by multiple laminated electrode layers. In general, a baked electrode layer or a resin electrode layer is provided as a base electrode layer in contact with the element body 10, and a single plating electrode layer or multiple plating electrode layers are provided on a surface of the base electrode layer.

When a baked electrode layer is provided, the baked electrode layer contains Ag, Cu, Pd, Au, Ni, or an alloy containing at least one of these metal elements, as a conductive material. Additionally, glass frit or oxide particles may be contained. When a resin electrode layer is provided, the resin electrode layer contains a conductive material similar to that of the above-mentioned baked electrode layer and additionally a thermosetting resin. When plating electrode layers are provided, the type and the number of the plating electrode layers are determined in view of a mounting method or usage environment of the transient voltage protection device 2. For example, Ni plating/Sn plating, Cu plating/Ni plating/Sn plating, Ni plating/Pd plating/Au plating, Ni plating/Pd plating/Ag plating, or Ni plating/Ag plating can be adopted as the plating electrode layers.

Now, an example method of manufacturing the transient voltage protection device 2 is described with reference to FIGS. 5 and 6.

First, an insulation layer slurry including constituent components of the insulation layers 11 is prepared. Specifically, adding a raw material powder of an insulating material (e.g., glass frit) to an organic vehicle containing an organic solvent and an organic binder and kneading them give the insulation layer slurry. Then, the slurry is applied to PET films using a doctor-blade method or the like and is dried as appropriate to give green sheets. In the present embodiment, a sheet on which a discharge portion pattern is printed is referred to as a first green sheet 110, and sheets on which no discharge portion patterns are printed are referred to as second green sheets 111.

Figure 5:
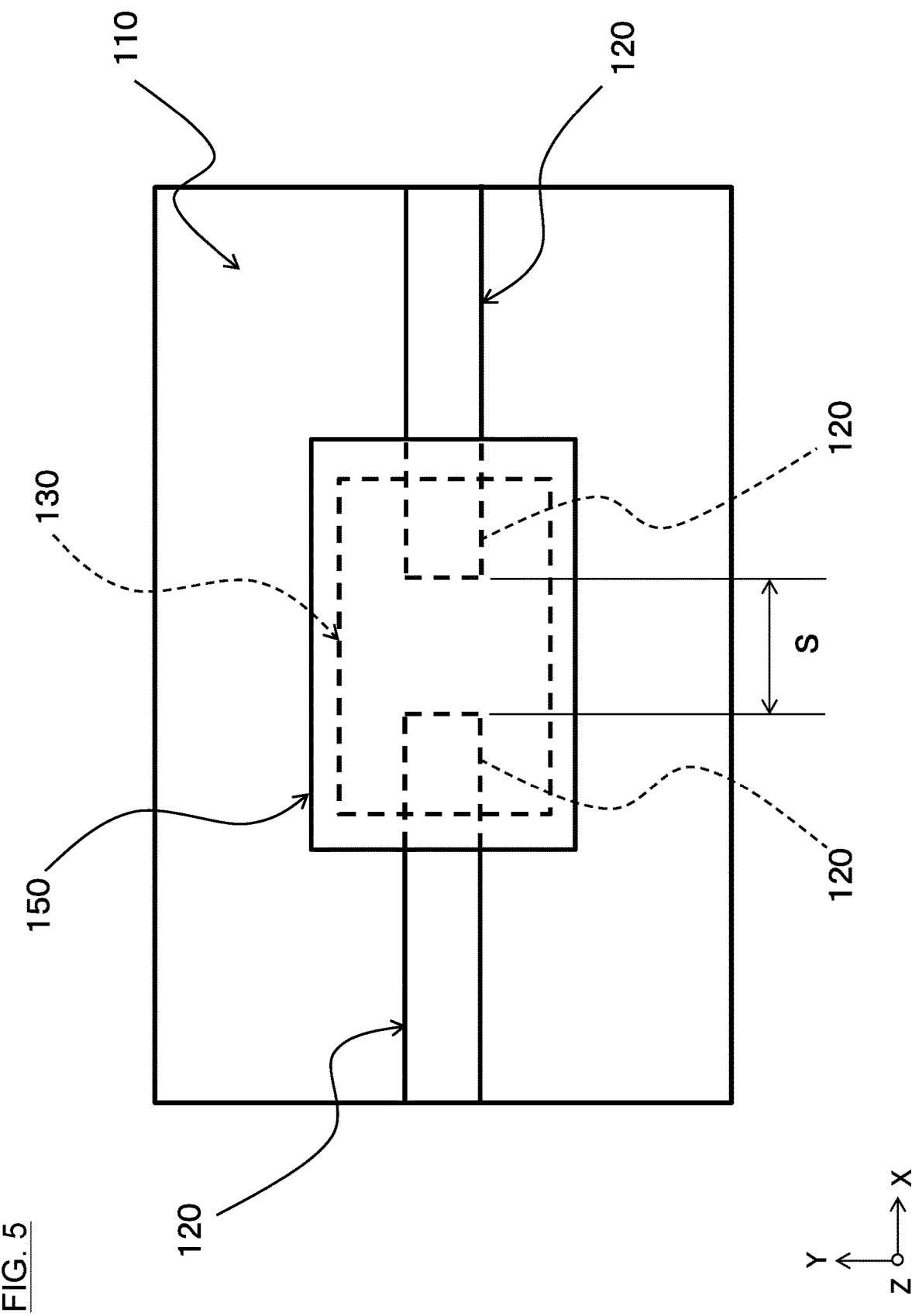
FIG. 5 is a plan view of a green sheet used in a manufacturing process of the transient voltage protection device.

Then, a discharge inducing portion pattern 130 shown in FIG. 5 is formed on the first green sheet 110 using a discharge inducing portion paste. The discharge inducing portion paste is manufactured by kneading a raw material of the ceramic component 31, a metal powder, and an organic vehicle containing a burn-out material. An example of the raw material of the ceramic component 31 is glass frit, which is a raw material of the glass 31*a*; and the composition of the glass 31*a* can be controlled according to the composition of the glass frit used. Also, when the ceramic particles 31*b* are to be included in the discharge inducing portion 30, a non-glass based ceramic powder (e.g., a semiconductor powder or a zirconia powder) is added as a raw material of the ceramic particles 31*b* to the discharge inducing portion paste.

One way to form the pores 36 is to use a discharge inducing portion paste that has resin beads (e.g., acrylic beads) added and has been kneaded with a triple-roll mill or the like. However, even when the discharge inducing portion paste manufactured in such a way is used, it is difficult to form the pores 36 having an average size $d_{P4}$ of 1 µm or less. To let the fine pores 36 having a predetermined average size $d_{P4}$ be scattered in the discharge inducing portion 30, preferably, a predetermined burn-out material is added to the discharge inducing portion paste, and a two-step kneading process is used to manufacture the discharge inducing portion paste.

A burn-out material added to the discharge inducing portion paste is a raw material for forming the pores 36 and is an organic component that is thermally decomposed to burn out during firing. In the present embodiment, a polymer compound that is soluble in a solvent in the organic vehicle is preferably used as the burn-out material. That is, in the discharge inducing portion paste, the burn-out material, which is the raw material for forming the pores 36, is present preferably as liquid. For example, as the solvent of the organic vehicle, organic solvents such as ethanol, methyl ethyl ketone (MEK), butyl carbitol, or terpineol are used; and examples of burn-out materials soluble in such organic solvents include cellulose resin, phenol resin, acrylic resin, urethane resin, and vinyl chloride resin. Among the above-mentioned polymer compounds, cellulose resin is preferably used; and, in particular, ethyl cellulose is more preferably used.

In kneading of the discharge inducing portion paste, preferably, a raw material paste is pulverized using a high-pressure wet pulverizing apparatus first (a first kneading step), and then the raw material paste after the first kneading step is kneaded using another kneader (a second kneading step). In the high-pressure wet pulverizing apparatus used in the first kneading step, the raw material paste introduced into the apparatus branches into two paths, and the raw material paste after branching undergoes oblique collision with each other under pressure (max: 245 MPa) in a chamber. Through the first kneading step in which the high-pressure wet pulverizing apparatus is used, the raw materials (e.g., the glass frit, the non-glass based ceramic powder, and the metal powder) included in the discharge inducing portion paste are pulverized, which can improve dispersibility. In the second kneading step, a ball mill, a bead mill, a triple-roll mill, or other kneaders (e.g., a homogenizer) can be used; and more preferably, a triple-roll mill is used.

The above two-step kneading process can further improve dispersibility and uniformity of the discharge inducing portion paste. That is, the two-step kneading process can reduce the average size $d_{PA}$ of the pores 36 and control the nearest inter-particle distances between the metal particles 33 within a desired range. The average size $d_{PA}$ and the area percentage $S_{PA}$ of the pores 36 are controlled based on mix percentages of the raw materials of the discharge inducing portion paste, conditions of the first kneading step (processing using the high-pressure wet pulverizing apparatus), and the like.

The discharge inducing portion pattern 130 is formed by, for example, various printing methods (e.g., screen printing), transfer methods, or application methods.

Next, a conductor pattern 120 shown in FIG. 5 is formed on the first green sheet 110 using a discharge electrode paste. The discharge electrode paste is manufactured by kneading a conductive powder, which is a raw material of the discharge electrodes 20, and an organic vehicle. Any method of kneading the discharge electrode paste may be used. For example, a ball mill, a bead mill, a triple-roll mill, a homogenizer, or a high-pressure wet pulverizing apparatus may be used, or at least two of these apparatuses may be used in combination.

The conductor pattern 120 is formed along the X-axis direction so as to extend over a surface of the first green sheet 110 and a surface of the discharge inducing portion pattern 130. The conductor pattern 120 has a slit S having a predetermined width on the surface of the discharge inducing portion pattern 130. This slit S is where the conductor pattern 120 is not printed, and the slit S becomes the gap G after firing. The conductor pattern 120 can be formed using a method similar to that of the discharge inducing portion pattern 130.

Next, using a cavity lacquer, a cavity pattern 150 is formed on the first green sheet having the discharge inducing portion pattern 130 and the conductor pattern 120 printed. The cavity lacquer includes an organic solvent and an organic binder that burn out during firing, and the cavity pattern 150 is used for forming the cavity 15 between the opposing portions of the discharge electrodes 20. The cavity pattern 150 is formed to preferably cover part of the conductor pattern 120 to be the opposing portions 21b and 22 and the discharge inducing portion pattern 130 as shown in FIG. 5. The above steps give the first green sheet 110 having the discharge portion pattern printed, which includes the discharge inducing portion pattern 130, the conductor pattern 120, and the cavity pattern 150.

Next, the first green sheet 110 having the discharge portion pattern and the second green sheets 111 are laminated and pressed in the lamination direction to give a green chip 100. At this time, the first green sheet 110 is laminated between the second green sheets 111 as shown in FIG. 6. The number of the second green sheets 111 is not limited; and the number of the second green sheets 111 above the first green sheet 110 and the number of the second green sheets 111 below the first green sheet 110 may be different.

Figure 6:
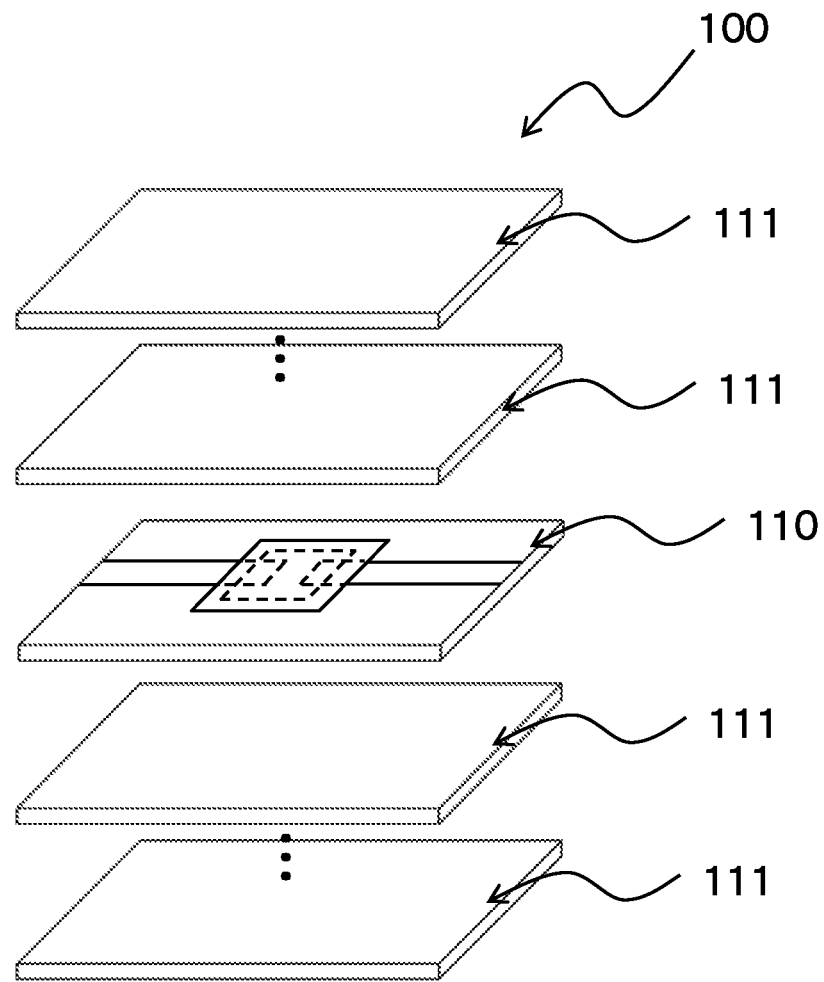
FIG. 6 is an exploded perspective view of a green chip used in the manufacturing process of the transient voltage protection device.

FIGS. 5 and 6 show steps of forming a single green chip for simplification of illustration. However, in actual manufacturing steps, normally, a green sheet having larger dimensions in an X-Y planar direction than the element body 10 is prepared, and multiple discharge portion patterns are continuously printed on a surface of the green sheet. Then, a mother laminated body is formed using the green sheet, and this mother laminated body is cut at predetermined intervals to give multiple green chips.

Next, the green chip 100 resulting from the above steps is subject to a firing treatment to give the element body 10. Conditions of the firing treatment are not limited; and conditions under which the element body 10 is sintered are selected according to components included in the element body 10. For example, the holding temperature may be 800° C. to 1200° C. The temperature holding time may be 0.1 to 3 hours. The firing atmosphere may be air, an inert gas atmosphere, or a reducing atmosphere. During the firing treatment, the cavity pattern 150 burns out, and the cavity 15 is formed where the cavity pattern 150 has been laminated. Also, the polymer compound (burn-out material) included in the discharge inducing portion pattern 130 burns out during the firing treatment, and pores 36 are formed inside the discharge inducing portion 30. Prior to the firing treatment, a binder removal treatment may be performed as appropriate. When the reducing atmosphere is used for firing, a reoxidation treatment may be performed after firing, or a heat treatment may be performed to remove strain after firing.

Next, on the surfaces of the element body 10 resulting from the above steps, the external electrodes 6 and 8 are formed. The external electrodes 6 and 8 are formed by any method. For example, when baked electrode layers are formed as the external electrodes 6 and 8, a conductive paste including glass frit is applied to the end surfaces of the element body 10, and then the element body 10 is subject to a heat treatment under predetermined conditions (e.g., at 600 to 800° C. for 1 to 5 hours in air). When resin electrodes are formed as the external electrodes 6 and 8, a conductive paste including a thermosetting resin is applied to the end surfaces of the element body 10, and then the element body 10 is heated at a temperature at which the thermosetting resin hardens. After the baked electrodes or the resin electrodes are formed by the above-mentioned method, sputtering, vapor deposition, electrolytic plating, electroless plating, or the like may be further performed to give the external electrodes 6 and 8 having a multilayer structure.

Such a manufacturing process gives the transient voltage protection device 2 shown in FIG. 1.

Summary of First Embodiment

The transient voltage protection device 2 according to the present embodiment includes the pair of discharge electrodes 20 opposing each other with the gap G therebetween and the discharge inducing portion 30 in contact with the pair of discharge electrodes 20. The discharge inducing portion 30 includes the ceramic component 31, the metal particles 33, and the pores 36, which are discontinuously scattered; and the average size $d_{PA}$ of the pores 36 is 0.05 μm or more and 1.04 μm or less.

The above characteristics of the transient voltage protection device 2 can reduce the discharge start voltage and improve ESD resistance. The reason why such effects are produced is not necessarily clear, but it is assumed that the reason is attributed to electric discharge inside the discharge inducing portion 30. Specifically, it is assumed that electric discharge occurs via the fine pores 36 in the discharge inducing portion 30 and that such electric discharge via the fine pores 36 increases the ESD absorption effect to enable reduction of the discharge start voltage. It is also assumed that such electric discharge via the fine pores 36 can disperse electric discharge generated at the gap G between the discharge electrodes 20 to improve ESD resistance.

In a section of the discharge inducing portion 30, the ratio ($A_{PA}/A_M$) of the total area of the pores 36 to the total area of the metal particles 33 is preferably 0.45 or more and 1.24 or less. Controlling $A_{PA}/A_M$ within the above range can further reduce the discharge start voltage and further improve ESD resistance.

In a section of the discharge inducing portion 30, the average nearest inter-particle distance ($ED_{Ave}$) between the metal particles 33 is preferably 0.25 μm or more and 0.81 μm or less. Controlling the average nearest inter-particle distance ($ED_{Ave}$) within the above range enables more suitable compatibility between a low discharge start voltage and good ESD resistance while short circuits between the discharge electrodes 20 are prevented.

The metal particles 33 preferably contain at least one selected from the group consisting of Pd, Ag, and Pt as the main component. Having at least one selected from the group consisting of Pd, Ag, and Pt as the main component can prevent melting of the metal particles 33 due to electric discharge and can further improve ESD resistance.

The discharge inducing portion 30 preferably contains zirconia particles as the ceramic particles 31b. Dispersing the zirconia particles in the discharge inducing portion 30 can prevent the metal particles 33 adjacent to each other from touching each other even when electric discharge causes partial melting of the metal particles 33 and can further improve ESD resistance.

Second Embodiment

A second embodiment of the present disclosure is described below with reference to FIGS. 4A to 4C. Internal structures of the discharge electrodes 20 of the second embodiment are different from those of the first embodiment, but other structures of the second embodiment are similar to those of the first embodiment. That is, the structure of the discharge inducing portion 30 of the second embodiment is similar to that of the first embodiment, and effects similar to those of the first embodiment can be attained as well in the second embodiment. Structures common to the second embodiment and the first embodiment are given the same reference numerals, and their description is omitted.

In the first embodiment, only the conductive metal as the main component has been described as the component of the discharge electrodes 20; however, the discharge electrodes 20 preferably include a predetermined inclusion 26 together with the conductive metal. Specifically, the discharge electrodes 20 of the second embodiment include a metal conductor portion 25 and the inclusion 26, which is discontinuously scattered in the metal conductor portion 25, as shown in FIGS. 4A to 4C.

The metal conductor portion 25 is a base material (matrix phase) of the discharge electrodes 20 and contains the conductive metal, which is the main component of the discharge electrodes 20. For example, the metal conductor portion 25 may contain, as the conductive metal, Ag, Pd, Au, Pt, Cu, Ni, Al, Mo, W, or an alloy containing at least one of these metal elements. In particular, the metal conductor portion 25 preferably contains Pd; and Pd constitutes more preferably 80 wt % or more or still more preferably 90 wt % or more of the discharge electrodes 20.

Figure 4A:
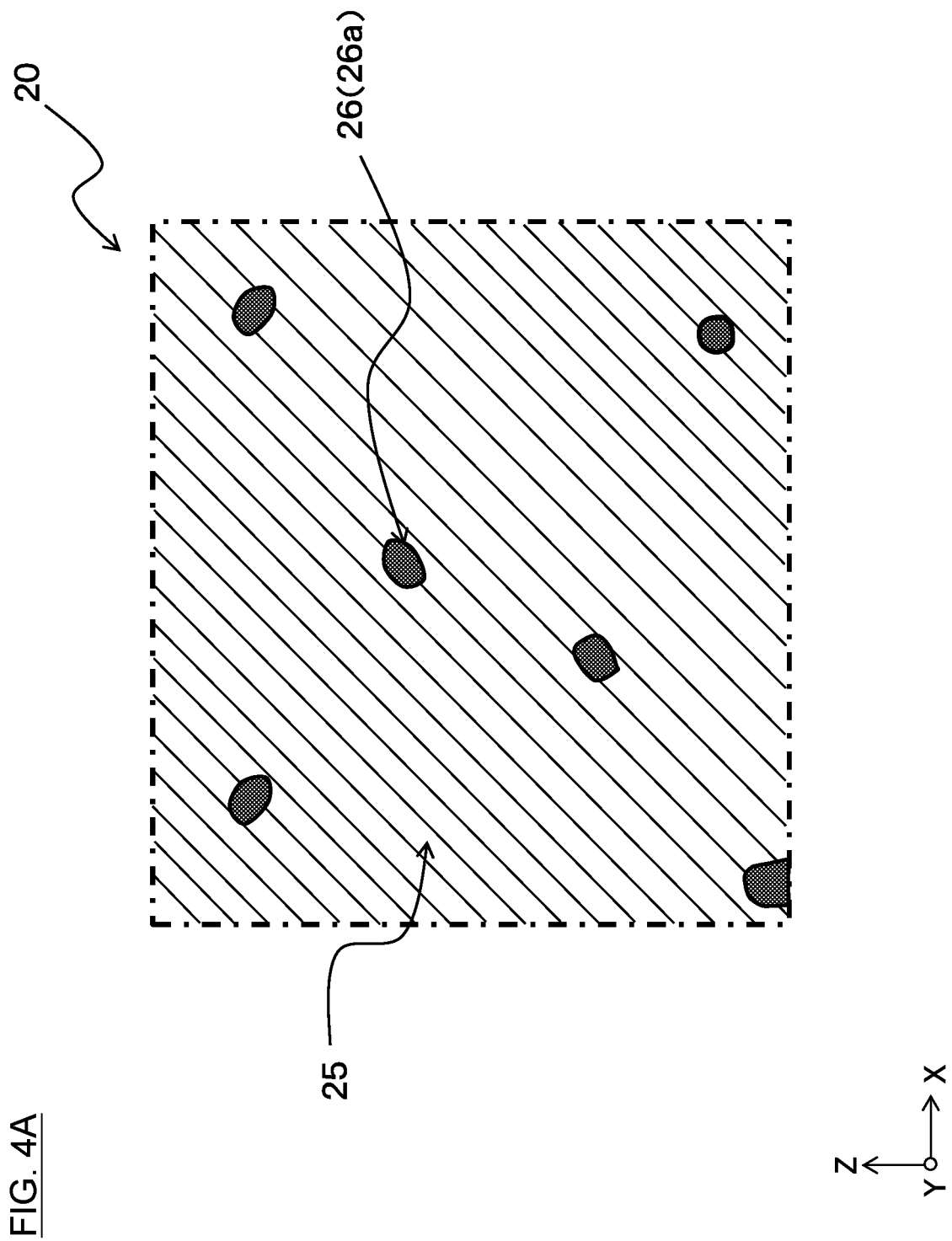
FIG. 4A is an example schematic sectional view of a discharge electrode.
Figure 4B:
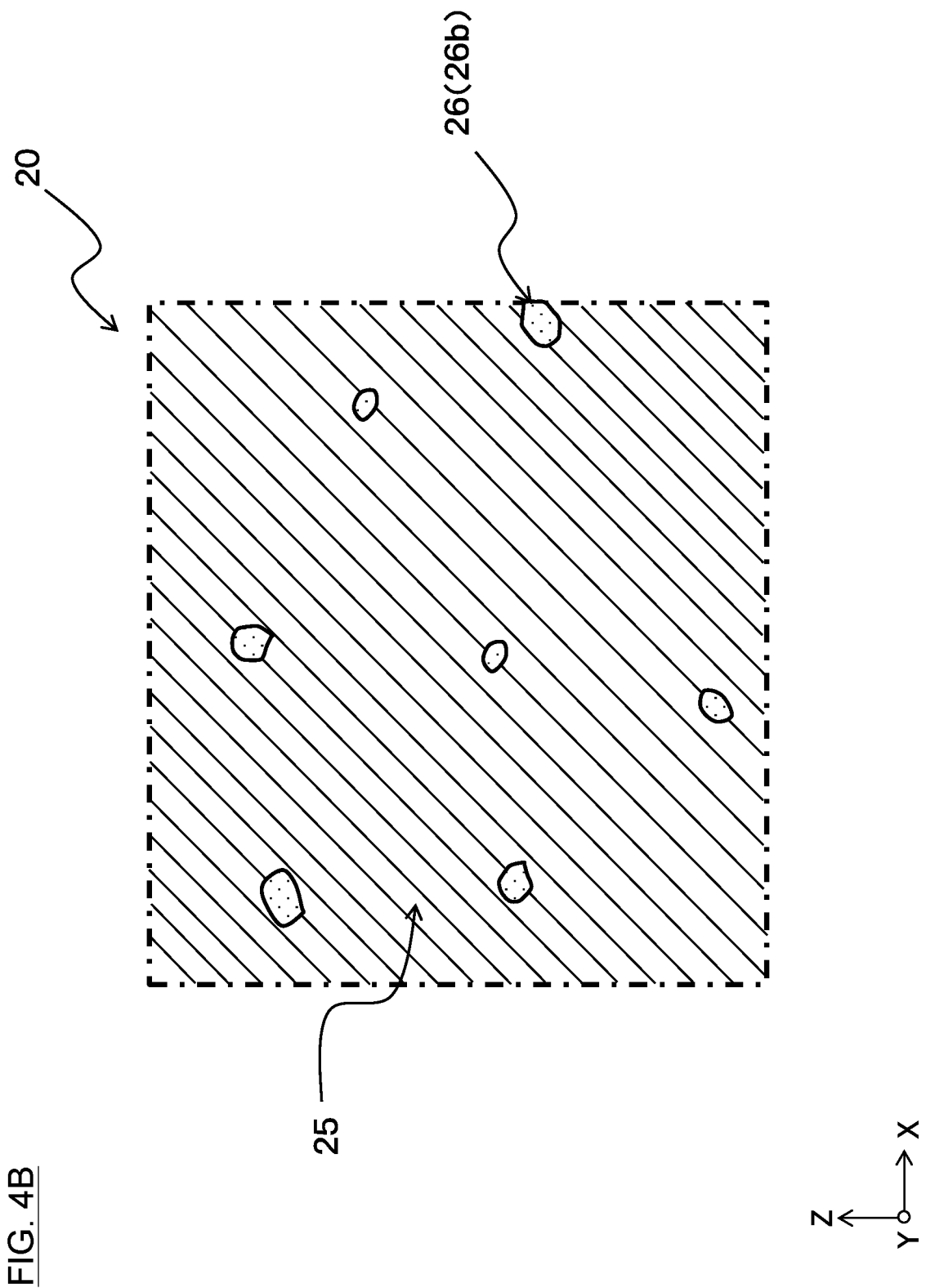
FIG. 4B is another example schematic sectional view of the discharge electrode.

Examples of the inclusion 26 dispersed in the discharge electrodes 20 include pores 26a shown in FIG. 4A and/or ceramic particles 26b shown in FIG. 4B. In particular, the discharge electrodes 20 more preferably have both the pores 26a and the ceramic particles 26b as shown in FIG. 4C.

When the discharge electrodes 20 have the pores 26a as shown in FIG. 4A or FIG. 4C, the pores 26a have an average size $d_{PE}$ of preferably 0.45 μm or more and 2.04 μm or less or more preferably 0.60 μm or more and 1.60 μm or less. A ratio ($d_{PE}/T_{DE}$) of the average size $d_{PE}$ of the pores 26a to the average thickness $T_{DE}$ of each discharge electrode 20 may be, for example, 0.03 or more and 0.35 or less or is preferably 0.05 or more and 0.25 or less. The pores 26a in a section of the discharge electrodes 20 occupy an area percentage of preferably 1.0% or more and 12.4% or less or more preferably 4.0% or more and 10.0% or less.

Dispersing the pores 26a having the above average size $d_{PE}$ inside the discharge electrodes 20 can further improve ESD resistance while a low discharge start voltage is maintained. The reason why the pores 26a of the discharge electrodes 20 improve ESD resistance is not necessarily clear. It is assumed that the pores 26a of the discharge electrodes 20 obstruct transfer of charge of the discharge electrodes 20 and slightly increase electrical resistance of the inside of the discharge electrodes 20. That is, it is assumed that the pores 26a make electrical resistance at surfaces of the discharge electrodes 20 relatively lower than that of the inside, making a current readily concentrate at the surfaces of the discharge electrodes 20. It is assumed that this disperses locations where electrical discharge occurs in the gap G between the discharge electrodes 20, leading to improvement of ESD resistance.

The average size $d_{PE}$ and the area percentage of the pores 26a of the discharge electrodes 20 are measured by a sectional analysis of the discharge electrodes 20, similarly to the analysis of the discharge inducing portion 30. Specifically, the average size $d_{PE}$ of the pores 26a is an arithmetic mean of circle equivalent diameters of the pores 26a in a section of the discharge electrodes 20 and is preferably calculated with circle equivalent diameters of at least one hundred pores 26a being identified. The area percentage of the pores 26a can be represented by ($A_{PE}/A_{DE}$)×100, where $A_{DE}$ is the total area of an analyzed section of the discharge electrodes 20 and $A_{PE}$ is the total area of the pores 26a of the section. When the area percentage of the pores 26a is calculated, preferably, multiple sectional images are analyzed to set $A_{DE}$ to at least 400 μm². Note that the pores 26a of the discharge electrodes 20 are distinguishable based on contrast of a SEM image or a STEM image.

When the discharge electrodes 20 include the ceramic particles 26b as shown in FIG. 4B or FIG. 4C, the ceramic particles 26b may contain, for example, silica ($SiO_2$), $TiO_2$, $Al_2O_3$, CaO, SrO, or BaO, or preferably contain silica as a main component. The main component of the ceramic particles 26b means a component included in the ceramic particles 26b at a highest percentage. When the main component of the ceramic particles 26b is silica, the ceramic particles 26b may be made of only $SiO_2$ or may contain a trace amount of other elements solid-dissolved.

The ceramic particles 26b of the discharge electrodes 20 have an average particle size $d_{CE}$ of preferably 0.05 μm or more and 0.54 μm or less or more preferably 0.15 μm or more and 0.40 μm or less. A ratio ($d_{CE}/T_{DE}$) of the average particle size $d_{CE}$ of the ceramic particles 26b to the average thickness $T_{DE}$ of each discharge electrode 20 may be, for example, 0.005 or more and 0.30 or less or is preferably 0.01 or more and 0.10 or less. The ceramic particles 26b in a section of the discharge electrodes 20 occupy an area percentage of preferably 0.4% or more and 5.1% or less, or more preferably 0.6% or more and 2.0% or less.

Dispersing the ceramic particles 26b having the above average particle size $d_{CE}$ inside the discharge electrodes 20 can further improve ESD resistance while a low discharge start voltage is maintained. The reason why the ceramic particles 26b of the discharge electrodes 20 improve ESD resistance is not necessarily clear. Similarly to the pores 26a, it is assumed that the ceramic particles 26b of the discharge electrodes 20 obstruct transfer of charge inside the discharge electrodes 20 and make electrical resistance at the surfaces of the discharge electrodes 20 relatively lower than that of the inside of the discharge electrodes 20. Also, it is assumed that a slight increase of electrical resistance of the inside of the discharge electrodes 20 by the ceramic particles 26b converts part of electrical energy of the discharge electrodes 20 into thermal energy. It is assumed that concentration of a current at the surfaces or/and conversion of electrical energy into thermal energy described above disperse locations where electrical discharge occurs in the gap G between the discharge electrodes 20, leading to improvement of ESD resistance.

The ceramic particles 26b of the discharge electrodes 20 are distinguishable based on contrast of a SEM image or a STEM image. The average particle size $d_{CE}$ and the area percentage of the ceramic particles 26b are analyzed using a method similar to that of the pores 26a.

When the discharge electrodes 20 include both the pores 26a and the ceramic particles 26b as shown in FIG. 4C, ESD resistance can be further improved than when only either of them is included (as in FIG. 4A or FIG. 4B).

The discharge electrodes 20 including the inclusion 26 shown in FIGS. 4A to 4C can be formed using a discharge electrode paste to which a raw material of the inclusion 26 is added. For example, to provide the discharge electrodes 20 with the pores 26a, a burn-out material composed of an organic material is added to the discharge electrode paste. Examples of burn-out materials include various resin beads, such as acrylic resin beads, carbon black, polystyrene, polyurethane, or polyvinyl benzene; and preferably acrylic resin beads are used. To disperse the ceramic particles 26b in the discharge electrodes 20, a powder containing the ceramic particles 26b is added to the discharge electrode paste.

It is difficult to provide the discharge inducing portion 30 with the pores 36 having a size of 1 µm or less using resin beads; however, the discharge electrodes 20 can be provided with the pores 26a having a size of 1 µm or less using resin beads. This is because, whereas the metal particles 33 of the discharge inducing portion 30 are not sintered, the metal component of the discharge electrodes 20 is sintered during firing unlike the discharge inducing portion 30.

Summary of Second Embodiment

In the transient voltage protection device 2 of the second embodiment, the discharge electrodes 20 have the pores 26a and/or the ceramic particles 26b. Not only providing the discharge inducing portion 30 with the pores 36 but also dispersing the predetermined inclusion 26 in the discharge electrodes 20 can further improve ESD resistance while a low discharge start voltage is maintained. When both the pores 26a and the ceramic particles 26b are included as the inclusion in the discharge electrodes 20, ESD resistance can be improved more than when only either one of the pores 26a and the ceramic particles 26b is included.

Modified Examples

The embodiments of the present disclosure have been described above; however, the present disclosure is not limited to the embodiments described above and can be modified variously without departing from the gist of the present disclosure.

Figure 7A:
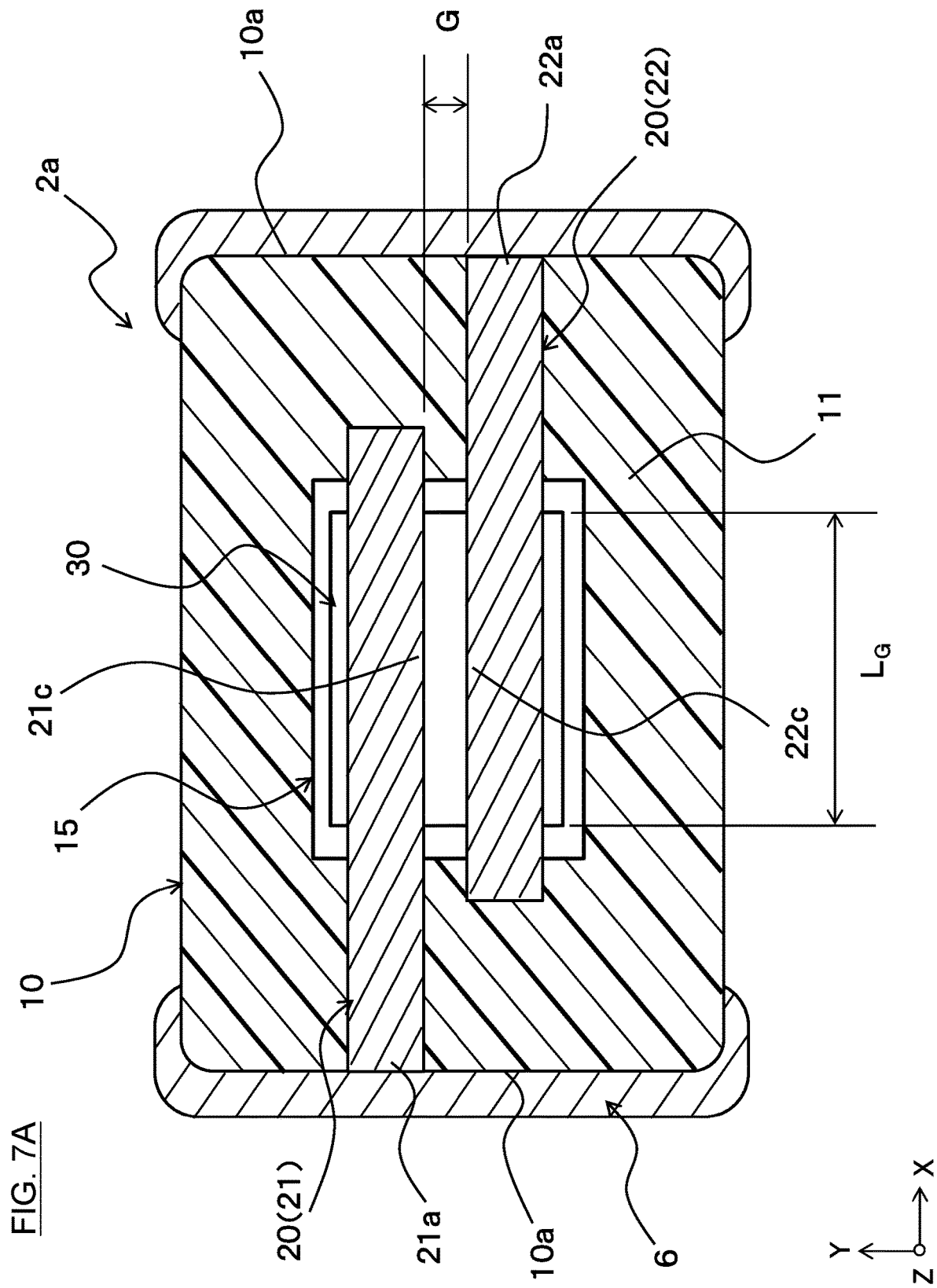
FIG. 7A is a sectional view of a modified example of the transient voltage protection device.

For example, the pair of discharge electrodes 20 may oppose each other in the Y-axis direction. In a transient voltage protection device 2a shown in FIG. 7A, a side edge 21c along the X-axis direction of the first discharge electrode 21 and a side edge 22c along the X-axis direction of the second discharge electrode 22 oppose each other with a gap G therebetween. That is, the side edges 21c and 22c are opposing portions, and electric discharge upon occurrence of transient voltages (e.g., ESD) occurs between the side edges 21c and 22c. When the side edges 21c and 22c of the discharge electrodes 20 oppose each other as shown in FIG. 7A, the opposing portions of the discharge electrodes 20 on the discharge inducing portion 30 can have a larger length $L_G$ than when the ends oppose each other. In the transient voltage protection device 2a shown in FIG. 7A, the ratio ($L_G$/G) of the length $L_G$ of the opposing portions to the width of the gap G in the Y-axis direction can be 0.3 or more or is preferably 0.5 or more and 50 or less.

In FIGS. 2A and 2B, one cavity 15 is provided so as to cover the discharge inducing portion 30 and the opposing portions of the discharge electrodes 20; however, multiple cavities 15 may be provided above the discharge electrodes 20 and the discharge inducing portion 30 in the Z-axis direction. Also, provided that the pair of discharge electrodes 20, the discharge inducing portion 30, and the cavity 15 constitute a discharge unit, the element body 10 may include multiple discharge units. Also, it may be that the transient voltage protection device has no cavity 15, and between the discharge electrodes may be the discharge inducing portion 30.

Figure 7B:
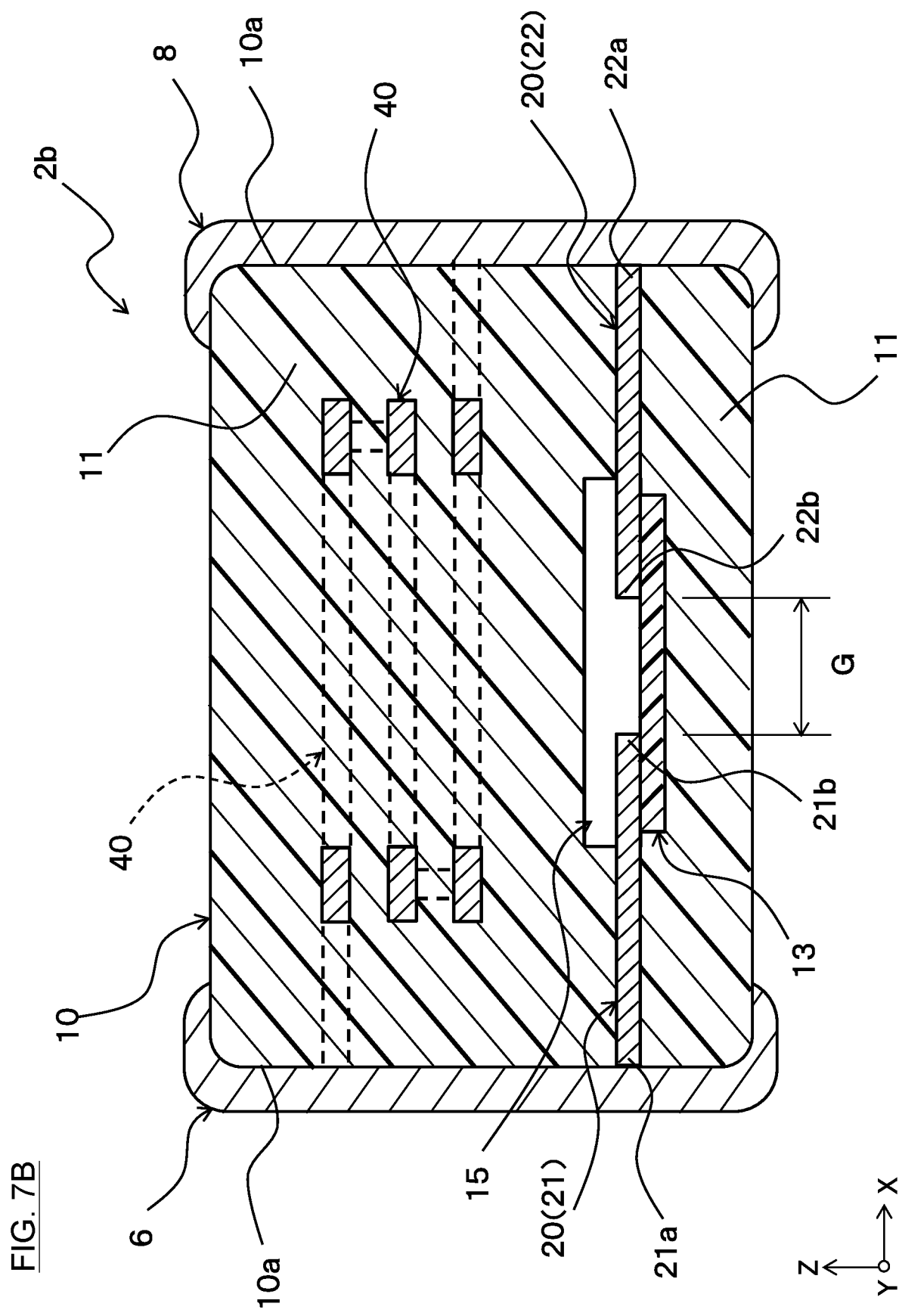
FIG. 7B is a sectional view of another modified example of the transient voltage protection device.

The element body 10 may include a coil 40 as shown in FIG. 7B. The element body 10 may further include a capacitor unit. The capacitor unit can be constituted by, for example, laminating internal electrode layers between the insulation layers 11.

EXAMPLES

Hereinafter, the present disclosure is described based on further detailed examples; however, the present disclosure is not limited to the examples.

Experiment 1

In Experiment 1, transient voltage protection devices according to Examples 1 to 8 were manufactured using the following procedure.

First, an insulation layer slurry, a discharge electrode paste, a discharge inducing portion paste, and a cavity lacquer were prepared. To the insulation layer slurry, glass and zirconia were added as raw material powders of the insulation layers, together with an organic vehicle. To the discharge electrode paste, an organic vehicle and a Pd powder having an average particle size of 0.5 µm were added.

In manufacture of the discharge inducing portion paste, a Pd powder having an average particle size of 0.5 μm, glass frit, a zirconia powder having an average particle size of 0.05 μm, ethyl cellulose (burn-out material), and ethanol (solvent) were used as raw materials. As the glass frit, glass frit containing $SiO_2$, SrO, CaO, and $B_2O_3$ was used.

The above raw materials were mixed, and then the resulting mixture was pulverized at 200 MPa using a high-pressure wet pulverizing apparatus. Then, ethanol (solvent) in the resulting slurry was vaporized to concentrate the slurry. Further, the concentrated slurry was kneaded with a triple-roll mill to give the discharge inducing portion paste. Table 1 shows mix percentages of the raw materials of the discharge inducing portion paste manufactured in each Example. Table 1 shows the respective mix percentages (vol %) of the Pd powder, the glass frit, the zirconia powder, and the burn-out material relative to the total (100 vol %) of these raw materials.

TABLE 1

| | Discharge inducing portion paste | | | | | | | | |
|---|---|---|---|---|---|---|---|---|---|
| | Raw materials | | | | | Mix percentages (vol %) | | | |
| Sample No. | Metal powder | Glass frit | Ceramic powder | Burn-out material | Solvent | Metal powder | Glass frit | Ceramic powder | Burn-out material |
| Comparative Example 1 | Pd | $SiO_2$—SrO—CaO—$B_2O_3$ | Zirconia | — | Ethanol | 25 | 52 | 23 | 0 |
| Comparative Example 2 | Pd | $SiO_2$—SrO—CaO—$B_2O_3$ | Zirconia | Ethyl cellulose | Ethanol | 14 | 46 | 18 | 22 |
| Comparative Example 3 | Pd | $SiO_2$—SrO—CaO—$B_2O_3$ | Zirconia | Acrylic beads | Ethanol | 18 | 47 | 18 | 17 |
| Example 1 | Pd | $SiO_2$—SrO—CaO—$B_2O_3$ | Zirconia | Ethyl cellulose | Ethanol | 19 | 48 | 18 | 15 |
| Example 2 | Pd | $SiO_2$—SrO—CaO—$B_2O_3$ | Zirconia | Ethyl cellulose | Ethanol | 22 | 47 | 16 | 15 |
| Example 3 | Pd | $SiO_2$—SrO—CaO—$B_2O_3$ | Zirconia | Ethyl cellulose | Ethanol | 16 | 49 | 20 | 15 |
| Example 4 | Pd | $SiO_2$—SrO—CaO—$B_2O_3$ | Zirconia | Ethyl cellulose | Ethanol | 18 | 47 | 18 | 17 |
| Example 5 | Pd | $SiO_2$—SrO—CaO—$B_2O_3$ | Zirconia | Ethyl cellulose | Ethanol | 20 | 45 | 16 | 19 |
| Example 6 | Pd | $SiO_2$—SrO—CaO—$B_2O_3$ | Zirconia | Ethyl cellulose | Ethanol | 17 | 45 | 16 | 22 |
| Example 7 | Pd | $SiO_2$—SrO—CaO—$B_2O_3$ | Zirconia | Ethyl cellulose | Ethanol | 15 | 46 | 18 | 21 |
| Example 8 | Pd | $SiO_2$—SrO—CaO—$B_2O_3$ | Zirconia | Ethyl cellulose | Ethanol | 14 | 46 | 18 | 22 |

Next, using the insulation layer slurry, green sheets were produced. Then, the discharge inducing portion paste, the discharge electrode paste, and the cavity lacquer were applied to some green sheets in the order mentioned to form discharge portion patterns.

Next, the green sheets having the discharge portion patterns printed and the green sheets with no discharge portion pattern were laminated in the predetermined order shown in FIG. 6 and were pressed in the lamination direction to give a mother laminated body. Then, the mother laminated body was cut to give green chips.

Next, the green chips were fired in an air atmosphere at 800 to 1200° C. for 0.1 to 1 hour to give element bodies (sintered bodies). Then, a conductive paste containing Ag was applied to outer surfaces of each element body, and the element body was heated at 700° C. for 1 hour, to form baked electrodes containing Ag. The above steps gave the transient voltage protection devices having the structures shown in FIGS. 1 to 2B.

Comparative Example 1

In Comparative Example 1, a discharge inducing portion paste that did not include a burn-out material was used. Specifically, glass frit, a Pd powder having an average particle size of 0.5 μm, a zirconia powder having an average particle size of 0.05 μm, and ethanol (solvent) were mixed, with no burn-out material added. Then, the resulting mixture was pulverized at 200 MPa using a high-pressure wet pulverizing apparatus. Additionally, ethanol (solvent) in the slurry resulting from pulverization using the high-pressure wet pulverizing apparatus was vaporized to concentrate the slurry. Further, the concentrated slurry was kneaded with a triple-roll mill to give the discharge inducing portion paste. In manufacture of transient voltage protection devices of Comparative Example 1, manufacturing conditions were similar to those of each Example except for the manufacturing conditions of the discharge inducing portion paste.

Comparative Example 2

In manufacture of a discharge inducing portion paste of Comparative Example 2, the raw materials were mixed at the same mix percentages as Example 8. However, only a triple-roll mill was used to knead the discharge inducing portion paste without use of a high-pressure wet pulverizing apparatus. In manufacture of transient voltage protection devices of Comparative Example 2, manufacturing conditions were similar to those of Example 8 except for the method of kneading the discharge inducing portion paste.

Comparative Example 3

In Comparative Example 3, a discharge inducing portion paste having acrylic resin beads instead of ethyl cellulose added as a burn-out material was used. Specifically, in Comparative Example 3, acrylic resin beads having an average particle size of 1 μm, glass frit, a Pd powder having an average particle size of 0.5 μm, a zirconia powder having an average particle size of 0.05 μm, and an organic vehicle were mixed. Then, the resulting mixture was pulverized at 200 MPa using a high-pressure wet pulverizing apparatus. Additionally, ethanol (solvent) in the slurry resulting from pulverization using the high-pressure wet pulverizing apparatus was vaporized to concentrate the slurry. Further, the concentrated slurry was kneaded with a triple-roll mill to give the discharge inducing portion paste. In manufacture of transient voltage protection devices of Comparative Example 3, manufacturing conditions were similar to those of each Example except for the manufacturing conditions of the discharge inducing portion paste.

The transient voltage protection devices of each Example and each Comparative Example were subject to the following evaluation.

Sectional Analysis of Discharge Inducing Portion

The transient voltage protection devices were cut to give a section shown in FIG. 2A, and the section resulting from cutting was mirror polished. The section of the discharge inducing portion was observed using a SEM; and the average size $d_{PA}$ (μm) of pores in the discharge inducing portion, the area percentage (%) of the pores, and the area percentage (%) of metal particles were measured. The average size of the pores was calculated by measuring circle equivalent diameters of one hundred pores. For calculation of the area percentage of the pores and the area percentage of the metal particles, the total area of the analyzed section of the discharge inducing portion was set to 400 μm². Using the area percentages of the pores and the metal particles, the ratio $(A_{PA}/A_M)$ of the total area of the pores to the total area of the metal particles was calculated.

In the sectional analysis of the discharge inducing portion, one hundred metal particles were freely selected; and, using the selected metal particles as center particles CP, an average nearest inter-particle distance ($ED_{Ave}$) was calculated using the method described in the description of the embodiments.

Evaluation of Discharge Characteristics

The discharge start voltage (kV) and ESD resistance (kV) of each sample were measured using the electrostatic discharge immunity test defined by IEC 61000-4-2. In the present experiment, samples having a discharge start voltage of 2.7 kV or less and an ESD resistance of 14 kV or more were deemed "good", and samples having a discharge start voltage of 2.0 kV or less and an ESD resistance of 17 kV or more were deemed "better".

Table 2 shows evaluation results of each Example and each Comparative Example. Note that, "–" marked in the "Average size of pores" column and the "$A_{PA}/A_M$" column of the discharge inducing portion indicates that no pores could be confirmed in sectional observation of the discharge inducing portion at a magnification of 5000×. That is, in Comparative Example 1 with "–" marked, the discharge inducing portion did not have pores. Also, "ND" marked in the discharge characteristics columns indicates that the discharge start voltage or ESD resistance was not capable to be measured due to a short circuit between the discharge electrodes.

TABLE 2

| | Discharge inducing portion | | | | |
|---|---|---|---|---|---|
| Sample No. | Average size of pores (μm) | $A_{PA}/A_M$ (—) | $ED_{Ave}$ (μm) | Discharge start voltage (kV) | ESD resistance (kV) |
| Comparative Example 1 | — | — | 0.10 | ND | ND |
| Comparative Example 2 | 1.22 | 1.38 | 0.21 | 3.0 | 8 |
| Comparative Example 3 | 1.95 | 1.21 | 0.15 | 2.8 | 9 |
| Example 1 | 0.09 | 0.42 | 0.22 | 2.3 | 14 |
| Example 2 | 0.10 | 0.50 | 0.25 | 1.8 | 16 |
| Example 3 | 0.12 | 0.58 | 0.51 | 2.1 | 17 |
| Example 4 | 0.19 | 0.68 | 0.38 | 2.0 | 18 |
| Example 5 | 0.63 | 0.95 | 0.64 | 1.9 | 20 |
| Example 6 | 0.99 | 1.20 | 0.81 | 2.4 | 15 |
| Example 7 | 1.03 | 1.24 | 0.98 | 2.7 | 17 |
| Example 8 | 1.04 | 1.38 | 0.78 | 2.5 | 15 |

As shown in Table 2, in Examples 1 to 8, the discharge start voltage could be lower, and ESD resistance could be more improved, than in Comparative Examples 1 to 3. These results revealed that dispersing the pores having an average size $d_{PA}$ of 0.05 μm or more and 1.04 μm or less inside the discharge inducing portion could result in a low discharge start voltage and high ESD resistance.

Also, it was revealed that, in terms of further improving the discharge start voltage and/or ESD resistance, $A_{PA}/A_M$ was preferably 0.45 or more and 1.24 or less. Similarly, it was revealed that, in terms of further improving the discharge start voltage and/or ESD resistance, the average nearest inter-particle distance ($ED_{Ave}$) was preferably 0.25 μm or more and 0.81 μm or less.

Experiment 2

In Experiment 2, transient voltage protection devices according to Examples 9 to 17 were manufactured, with structures of the discharge electrodes changed from those of Experiment 1. In Examples 9 to 17 of Experiment 2, manufacturing conditions were similar to those of Example 4 except for the manufacturing conditions of the discharge electrode paste. That is, in Examples 9 to 17 of Experiment 2, the discharge inducing portion paste used in Example 4 of Experiment 1 was used to form the discharge inducing portion. Respective discharge electrode pastes used for Examples of Experiment 2 are described below in detail.

Examples 9 to 11

In Examples 9 to 11, a Pd powder having an average particle size of 0.5 μm, acrylic resin beads, and an organic vehicle were mixed and kneaded using a triple-roll mill to give discharge electrode pastes. Specifically, in Example 9, acrylic resin beads having an average particle size of 1 μm were used, and the acrylic resin beads constituted 3 vol % of the corresponding discharge electrode paste. In Example 10, acrylic resin beads having an average particle size of 1 μm were used, and the acrylic resin beads constituted 12 vol % of the corresponding discharge electrode paste. In Example 11, acrylic resin beads having an average particle size of 1 μm were used, and the acrylic resin beads constituted 16 vol % of the corresponding discharge electrode paste. Note that the Pd powder and the organic vehicle added to the discharge electrode pastes had the same specifications as those of Example 4.

Examples 12 to 14

In Examples 12 to 14, discharge electrode pastes were manufactured with a silica powder added instead of acrylic resin beads (burn-out material). Specifically, in Example 12, a silica powder having an average particle size of 0.05 μm was used, and the silica powder constituted 1 vol % of the corresponding discharge electrode paste. In Example 13, a silica powder having an average particle size of 0.05 μm was used, and the silica powder constituted 2 vol % of the corresponding discharge electrode paste. In Example 14, a silica powder having an average particle size of 0.05 μm was used, and the silica powder constituted 7 vol % of the corresponding discharge electrode paste. Note that the Pd powder and the organic vehicle added to the discharge electrode pastes had the same specifications as those of Example 4.

Examples 15 to 17

In Examples 15 to 17, discharge electrode pastes were manufactured with both acrylic resin beads and a silica powder added. The Pd powder and the organic vehicle in the discharge electrode pastes of Examples 15 to 17 had the same specifications as those of Example 4.

In Example 15, acrylic resin beads having an average particle size of 1 μm and a silica powder having an average particle size of 0.05 μm were used. The acrylic resin beads constituted 3 vol % of the corresponding discharge electrode paste, and the silica powder constituted 1 vol % thereof.

In Example 16, acrylic resin beads having an average particle size of 1 μm and a silica powder having an average particle size of 0.05 μm were used. The acrylic resin beads constituted 12 vol % of the corresponding discharge electrode paste, and the silica powder constituted 2 vol % thereof.

In Example 17, acrylic resin beads having an average particle size of 1 μm and a silica powder having an average particle size of 0.05 μm were used. The acrylic resin beads constituted 12 vol % of the corresponding discharge electrode paste, and the silica powder constituted 7 vol % thereof.

Similarly to Experiment 1, in Experiment 2, a sectional analysis of the discharge inducing portion and evaluation of discharge characteristics were performed. In addition to these analyses, in Experiment 2, a sectional analysis of the discharge electrodes was performed to measure the average size $d_{PE}$ of pores in the discharge electrodes, the area percentage of the pores, the average particle size $d_{CE}$ of ceramic particles, and the area percentage of the ceramic particles. The average size of the pores was calculated by measuring circle equivalent diameters of one hundred pores. The average particle size of the ceramic particles was calculated by measuring circle equivalent diameters of one hundred ceramic particles. For calculation of the area percentage of the pores and the area percentage of the ceramic particles, the total area of the analyzed section of the discharge electrodes was set to 400 μm².

Table 3 shows evaluation results of each Example of Experiment 2.

TABLE 3

| | Discharge inducing portion | | | Discharge electrodes | | | | Discharge | |
| | | | | Pores | | Ceramic particles | | | |
| Sample No. | Average size of pores (μm) | $A_{PA}/A_M$ (—) | $ED_{Ave}$ (μm) | Average size (μm) | Area percentage (%) | Average size (μm) | Area percentage (%) | start voltage (kV) | ESD resistance (kV) |
|---|---|---|---|---|---|---|---|---|---|
| Example 4 | 0.19 | 0.68 | 0.38 | — | — | — | — | 2.0 | 18 |
| Example 9 | 0.18 | 0.64 | 0.38 | 0.52 | 1.50 | — | — | 1.9 | 19 |
| Example 10 | 0.23 | 0.77 | 0.35 | 1.12 | 9.50 | — | — | 1.9 | 20 |
| Example 11 | 0.25 | 0.84 | 0.33 | 1.96 | 11.80 | — | — | 1.8 | 20 |
| Example 12 | 0.22 | 0.70 | 0.38 | — | — | 0.12 | 0.49 | 2.0 | 19 |
| Example 13 | 0.19 | 0.60 | 0.41 | — | — | 0.25 | 0.90 | 2.1 | 21 |
| Example 14 | 0.17 | 0.66 | 0.40 | — | — | 0.49 | 4.92 | 2.1 | 19 |
| Example 15 | 0.18 | 0.65 | 0.40 | 0.49 | 1.10 | 0.15 | 0.55 | 2.0 | 22 |
| Example 16 | 0.20 | 0.75 | 0.37 | 0.94 | 8.10 | 0.20 | 0.79 | 2.0 | 23 |
| Example 17 | 0.22 | 0.72 | 0.36 | 1.03 | 8.40 | 0.51 | 5.10 | 1.9 | 23 |

As shown in Table 3, it was revealed that dispersing the pores and/or the ceramic particles inside the discharge electrodes could further improve ESD resistance while a low discharge start voltage was maintained. Among Examples of Experiment 2, ESD resistance was good particularly in Examples 15 to 17; and it was revealed that the discharge electrodes preferably had both the pores and the ceramic particles rather than either one of the pores and the ceramic particles.

Experiment 3

In Experiment 3, transient voltage protection devices according to Examples 18 to 24 were manufactured, with raw materials of the discharge inducing portion and/or the discharge electrodes changed from those of Experiment 1. Detailed description follows.

Example 18

Transient voltage protection devices were manufactured as in Example 1 except that a Pt powder having an average particle size of 0.5 μm was used instead of the Pd powder having an average particle size of 0.5 μm for producing a discharge inducing portion paste.

Example 19

Transient voltage protection devices were manufactured as in Example 3 except that a Pt powder having an average particle size of 0.5 μm was used instead of the Pd powder having an average particle size of 0.5 μm for producing a discharge inducing portion paste.

Example 20

Transient voltage protection devices were manufactured as in Example 5 except that a Pt powder having an average particle size of 0.5 μm was used instead of the Pd powder having an average particle size of 0.5 μm for producing a discharge inducing portion paste.

Example 21

Transient voltage protection devices were manufactured as in Example 7 except that a Pt powder having an average particle size of 0.5 μm was used instead of the Pd powder having an average particle size of 0.5 μm for producing a discharge inducing portion paste.

an average particle size of 0.5 μm was used instead of the Pd powder having an average particle size of 0.5 μm for producing a discharge inducing portion paste.

Table 4 shows mix percentages of the raw materials of the discharge inducing portion paste of each Example of Experiment 3. Similarly to Experiment 1, in Experiment 3, a sectional analysis of the discharge inducing portion and evaluation of discharge characteristics were performed. Table 5 shows those evaluation results.

TABLE 4

| Sample No. | Discharge electrodes Raw material Metal powder | Discharge inducing portion paste | | | | | | | | |
|---|---|---|---|---|---|---|---|---|---|---|
| | | Raw materials | | | | | Mix percentages (vol %) | | | |
| | | Metal powder | Glass frit | Ceramic powder | Burn-out material | Solvent | Metal powder | Glass frit | Ceramic powder | Burn-out material |
| Comparative Example 2 | Pd | Pd | $SiO_2$—SrO—CaO—$B_2O_3$ | Zirconia | Ethyl cellulose | Ethanol | 14 | 46 | 18 | 22 |
| Example 18 | Pd | Pt | $SiO_2$—SrO—CaO—$B_2O_3$ | Zirconia | Ethyl cellulose | Ethanol | 19 | 48 | 18 | 15 |
| Example 19 | Pd | Pt | $SiO_2$—SrO—CaO—$B_2O_3$ | Zirconia | Ethyl cellulose | Ethanol | 16 | 49 | 20 | 15 |
| Example 20 | Pd | Pt | $SiO_2$—SrO—CaO—$B_2O_3$ | Zirconia | Ethyl cellulose | Ethanol | 20 | 45 | 16 | 19 |
| Example 21 | Pd | Pt | $SiO_2$—SrO—CaO—$B_2O_3$ | Zirconia | Ethyl cellulose | Ethanol | 15 | 46 | 18 | 21 |
| Example 22 | Pt | Pt | $SiO_2$—SrO—CaO—$B_2O_3$ | Zirconia | Ethyl cellulose | Ethanol | 16 | 49 | 20 | 15 |
| Example 23 | Pt | Pt | $SiO_2$—SrO—CaO—$B_2O_3$ | Zirconia | Ethyl cellulose | Ethanol | 20 | 45 | 16 | 19 |
| Example 24 | Pd | Ag—Pd | $SiO_2$—SrO—CaO—$B_2O_3$ | Zirconia | Ethyl cellulose | Ethanol | 16 | 49 | 20 | 15 |

Example 22

Transient voltage protection devices were manufactured as in Example 3 except that a Pt powder having an average particle size of 0.5 μm was used instead of the Pd powder having an average particle size of 0.5 μm for producing a discharge electrode paste and that a Pt powder having an average particle size of 0.5 μm was used instead of the Pd powder having an average particle size of 0.5 μm for producing a discharge inducing portion paste.

Example 23

Transient voltage protection devices were manufactured as in Example 5 except that a Pt powder having an average particle size of 0.5 μm was used instead of the Pd powder having an average particle size of 0.5 μm for producing a discharge electrode paste and that a Pt powder having an average particle size of 0.5 μm was used instead of the Pd powder having an average particle size of 0.5 μm for producing a discharge inducing portion paste.

Example 24

Transient voltage protection devices were manufactured as in Example 3 except that a Ag—Pd alloy powder having

TABLE 5

| | Discharge inducing portion | | | | |
|---|---|---|---|---|---|
| Sample No. | Average size of pores (μm) | $A_{P4}/A_M$ (—) | $ED_{Ave}$ (μm) | Discharge start voltage (kV) | ESD resistance (kV) |
| Comparative Example 2 | 1.22 | 1.38 | 0.21 | 3.0 | 8 |
| Example 18 | 0.05 | 0.45 | 0.25 | 1.8 | 17 |
| Example 20 | 0.70 | 0.98 | 0.69 | 1.9 | 21 |
| Example 21 | 1.04 | 1.22 | 0.80 | 2.3 | 18 |
| Example 22 | 0.33 | 0.62 | 0.59 | 2.0 | 21 |
| Example 23 | 0.89 | 1.05 | 0.68 | 2.0 | 22 |
| Example 24 | 0.14 | 0.60 | 0.53 | 2.0 | 20 |

As shown in Table 5, even when the raw materials of the discharge inducing portion or/and the discharge electrodes differed from those of Experiment 1, the discharge start voltage could be reduced, and ESD resistance could be improved. That is, it was revealed that dispersing the pores having an average size $d_{P4}$ of 0.05 μm or more and 1.04 μm or less inside the discharge inducing portion could result in a low discharge start voltage and high ESD resistance even when Pt or a Ag—Pd alloy was used for the discharge inducing portion. Also, it was revealed that use of Pt as metal particles in the discharge inducing portion could further improve ESD resistance compared to Experiment 1. Moreover, it was revealed that, in particular, use of Pt for the discharge electrodes could further improve ESD resistance.

Experiment 4

In Experiment 4, transient voltage protection devices according to Examples 25 to 30 were manufactured, with raw materials of the discharge inducing portion and/or the discharge electrodes changed from those of Experiment 2. Detailed description follows.

Example 25

Transient voltage protection devices were manufactured as in Example 10 except that a Pt powder having an average particle size of 0.5 μm was used instead of the Pd powder having an average particle size of 0.5 μm for producing a discharge inducing portion paste.

Example 26

Transient voltage protection devices were manufactured as in Example 13 except that a Pt powder having an average particle size of 0.5 μm was used instead of the Pd powder having an average particle size of 0.5 μm for producing a discharge inducing portion paste.

Example 27

Transient voltage protection devices were manufactured as in Example 16 except that a Pt powder having an average particle size of 0.5 μm was used instead of the Pd powder having an average particle size of 0.5 μm for producing a discharge inducing portion paste.

Example 28

Transient voltage protection devices were manufactured as in Example 16 except that a Pt powder having an average particle size of 0.5 μm was used instead of the Pd powder having an average particle size of 0.5 μm for producing a discharge electrode paste and that a Pt powder having an average particle size of 0.5 μm was used instead of the Pd powder having an average particle size of 0.5 μm for producing a discharge inducing portion paste.

Example 29

Transient voltage protection devices were manufactured as in Example 16 except that a Ag—Pd alloy powder having an average particle size of 0.5 μm was used instead of the Pd powder having an average particle size of 0.5 μm for producing a discharge inducing portion paste.

Example 30

Transient voltage protection devices were manufactured as in Example 16 except that a Ag—Pd alloy powder having an average particle size of 0.5 μm was used instead of the Pd powder having an average particle size of 0.5 μm for producing a discharge electrode paste and that a Pt powder having an average particle size of 0.5 μm was used instead of the Pd powder having an average particle size of 0.5 μm for producing a discharge inducing portion paste.

In Experiment 4, evaluation similar to that of Experiment 2 was performed as well. Table 6 shows evaluation results of each Example of Experiment 4.

TABLE 6

| Sample No. | Discharge inducing portion Raw material Metal powder | Discharge inducing portion Average size of pores (μm) | $A_{PA}/A_M$ (—) | $ED_{Ave}$ (μm) | Discharge electrodes Raw material Metal powder | Discharge electrodes Pores Average size (μm) | Discharge electrodes Pores Area percentage (%) | Discharge electrodes Ceramic particles Average size (μm) | Discharge electrodes Ceramic particles Area percentage (%) | Discharge start voltage (kV) | ESD resistance (kV) |
|---|---|---|---|---|---|---|---|---|---|---|---|
| Example 4 | Pd | 0.19 | 0.68 | 0.38 | Pd | — | — | — | — | 2.0 | 18 |
| Example 25 | Pt | 0.21 | 0.75 | 0.34 | Pd | 1.09 | 9.40 | — | — | 1.9 | 21 |
| Example 26 | Pt | 0.19 | 0.61 | 0.43 | Pd | — | — | 0.23 | 0.88 | 2.0 | 22 |
| Example 27 | Pt | 0.23 | 0.79 | 0.40 | Pd | 0.97 | 8.12 | 0.20 | 0.81 | 1.9 | 24 |
| Example 28 | Pt | 0.28 | 0.88 | 0.45 | Pt | 1.01 | 8.40 | 0.26 | 0.87 | 2.0 | 25 |
| Example 29 | Ag—Pd | 0.18 | 0.71 | 0.33 | Pd | 0.89 | 7.80 | 0.18 | 0.71 | 2.0 | 21 |
| Example 30 | Pt | 0.26 | 0.80 | 0.41 | Ag—Pd | 0.66 | 6.90 | 0.14 | 0.62 | 1.9 | 21 |

As shown in Table 6, it was revealed that, even when the raw materials of the discharge inducing portion or/and the discharge electrodes differed from those of Experiment 2, dispersing the pores and/or the ceramic particles inside the discharge electrodes could further improve ESD resistance while a low discharge start voltage was maintained, similarly to Experiment 2. In particular, the results of Examples 25 to 27 among Examples of Experiment 4 revealed that ESD resistance was further improved when both the pores and the ceramic particles were included rather than when only either one of the pores and the ceramic particles was included. Also, it was revealed that use of Pt as metal particles in the discharge inducing portion could further improve ESD resistance compared to Experiment 2. Moreover, it was revealed that, in particular, use of Pt for the discharge electrodes could further improve ESD resistance.

REFERENCE NUMERALS 2, 2a, 2b . . . transient voltage protection device
10 . . . element body
10a . . . end surface
10b . . . side surface
10c . . . main surface
11 . . . insulation layer
20 . . . discharge electrode
21 . . . first discharge electrode
22 . . . second discharge electrode
21a, 22a . . . lead-out portion
21b, 22b . . . opposing portion
25 . . . metal conductor portion
26 . . . inclusion
26a . . . pore 26b . . . ceramic particle (in discharge electrode)
30 . . . discharge inducing portion
31 . . . ceramic component
31a . . . glass
31b . . . ceramic particle (in discharge inducing portion)
33 . . . metal particle
36 . . . pore (in discharge inducing portion)
15 . . . cavity
6 . . . first external electrode
8 . . . second external electrode
100 . . . green chip
110 . . . first green sheet
120 . . . conductor pattern
130 . . . discharge inducing portion pattern
150 . . . cavity pattern
111 . . . second green sheet

What is claimed is:

1. A transient voltage protection device comprising:
a pair of discharge electrodes opposing each other with a gap therebetween; and
a discharge inducing portion in contact with the pair of discharge electrodes,
wherein
the discharge inducing portion comprises a ceramic component, metal particles, and pores discontinuously scattered; and
the pores have an average size of 0.10 μm or more and less than 1.00 μm.

2. The transient voltage protection device according to claim 1, wherein a ratio of a total area of the pores to a total area of the metal particles in a section of the discharge inducing portion is 0.45 or more and 1.24 or less.

3. The transient voltage protection device according to claim 1, wherein nearest inter-particle distances between the metal particles average 0.25 μm or more and 0.81 μm or less.

4. The transient voltage protection device according to claim 1, wherein the metal particles comprise at least one selected from the group consisting of Pd, Ag, and Pt as a main component.

5. The transient voltage protection device according to claim 1, wherein the discharge inducing portion further comprises a zirconia particle.

6. The transient voltage protection device according to claim 1, wherein the pores have an average size of 0.15 μm or more and 0.74 μm or less.

* * * * *